United States Patent
Oteri et al.

(10) Patent No.: US 10,707,934 B2
(45) Date of Patent: Jul. 7, 2020

(54) MULTI-RESOLUTION BEAM TRAINING IN MMW WLAN SYSTEMS

(71) Applicant: INTERDIGITAL PATENT HOLDINGS, INC., Wilmington, DE (US)

(72) Inventors: Oghenekome Oteri, San Diego, CA (US); Alphan Sahin, Westbury, NY (US); Hanqing Lou, Syosset, NY (US); Xiaofei Wang, Cedar Grove, NJ (US); Cen Lin, Brookhaven, GA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/083,757

(22) PCT Filed: Mar. 10, 2017

(86) PCT No.: PCT/US2017/021732
§ 371 (c)(1),
(2) Date: Sep. 10, 2018

(87) PCT Pub. No.: WO2017/156366
PCT Pub. Date: Sep. 14, 2017

(65) Prior Publication Data
US 2019/0081674 A1 Mar. 14, 2019

Related U.S. Application Data

(60) Provisional application No. 62/416,883, filed on Nov. 3, 2016, provisional application No. 62/306,446, filed on Mar. 10, 2016.

(51) Int. Cl.
H04B 7/06 (2006.01)
H04B 7/0417 (2017.01)
(Continued)

(52) U.S. Cl.
CPC ......... H04B 7/0617 (2013.01); H04B 7/0421 (2013.01); H04B 7/0456 (2013.01);
(Continued)

(58) Field of Classification Search
CPC ................ H04B 7/0421; H04B 7/0456; H04B 7/06–0619; H04B 7/0695; H04B 7/088
See application file for complete search history.

(56) References Cited

U.S. PATENT DOCUMENTS 9,264,913 B2  2/2016 Tsukizawa et al.
10,389,418 B2  8/2019 Kakishima et al.
(Continued)

OTHER PUBLICATIONS

Agilent Technologies, "Wireless LAN and 60 GHz—IEEE 802.11ad Explained," pp. 1-28 (May 20, 2013).
(Continued)

*Primary Examiner* — Pao Sinkantarakorn
(74) *Attorney, Agent, or Firm* — Volpe and Koenig, P.C.

(57) ABSTRACT

Systems, methods, and instrumentalities are disclosed for multi-resolution training, for example, in millimeter wave (mmW) WLAN systems. In a Multi-Resolution Beam Refinement Protocol (MR-BRP), an access point (AP)/PBSS control point (PCP) and a station (STA) may perform multi-resolution beamforming training, for example, by changing a sub-beam resolution or by maintaining sub-beam resolution while changing a resolution of the beamforming training between levels or stages of training. Sub-beam resolution may be changed, for example, by assigning different angular spreads to or by downselecting a number of antenna elements while keeping inter-element spacing constant between levels of training. Resolution of beamforming training may be changed, for example, by downsampling sub-beams or by downsampling antenna elements while adjusting inter-element spacing. Beamforming training (e.g. refinement) levels may refine beams by changing a resolu-
(Continued)

tion of antenna weight vectors (AWVs). An AP/PCP and STA may search through a sector multiple times with sub-beams of different resolution to identify a correct pair of sub-beams at a desired resolution. MR-BRP may be used for single or multiple beams, for example, to generate M sub-beams (AWVs) for N beams sequentially or in parallel. MR-BRP may be used for beam tracking. Devices may save the best sub-beam at each level of MR-BRP and may revert (fall back) to a sub-beam at previous level. MR-BRP signaling may indicate MR-BRP capability, type, frame format, etc.

10 Claims, 27 Drawing Sheets

(51) Int. Cl.
  H04B 7/0456 (2017.01)
  H04W 84/12 (2009.01)
  H04B 7/0491 (2017.01)
  H04L 27/18 (2006.01)
(52) U.S. Cl.
  CPC ............ *H04B 7/0491* (2013.01); *H04B 7/061* (2013.01); *H04B 7/0695* (2013.01); *H04L 27/183* (2013.01); *H04W 84/12* (2013.01); *H04B 7/0619* (2013.01)

(56) References Cited

U.S. PATENT DOCUMENTS

| | | | |
|---|---|---|---|
| 2009/0232240 A1 | 9/2009 | Lakkis | |
| 2012/0106474 A1 | 5/2012 | Wu et al. | |
| 2015/0244432 A1 | 8/2015 | Wang | |
| 2015/0341105 A1 | 11/2015 | Yu et al. | |
| 2016/0065284 A1* | 3/2016 | Yu .......................... | H04W 16/28 370/329 |
| 2016/0119043 A1* | 4/2016 | Rajagopal ............... | H04B 7/063 370/329 |
| 2016/0323755 A1* | 11/2016 | Cordeiro ............. | H04J 13/0014 |

OTHER PUBLICATIONS

Chen et al., "MAC and PHY Proposal for 802.11af," IEEE 802.11-10/0258r0 (Mar. 2010).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011).
Halasz, "Sub 1 GHz license-exempt PAR and 5C," IEEE P802.11 Wireless LANs, IEEE 802.11-10/0001r13 (Jul. 2010).
IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).
IEEE P802.11ah/D5.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D5.0 (Mar. 2015).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah-2016 (Dec. 7, 2016).
Oteri et al., "Further Details on Multi-Stage, Multi-Resolution Beamforming Training in 802.11ay," IEEE 802.11-16/1447r0 (Nov. 7, 2016).
Oteri et al., "Multi-Stage, Multi-Resolution Beamforming Training for 802.11ay," IEEE 802.11-16/1175r0 (Sep. 12, 2016).
Sun et al., "IEEE 802.11 TGay Use Cases," IEEE 802.11-2015/0625r2 (May 2015).
Lakkis et al., "IEEE802.15.3c Beamforming Overview," IEEE 802.11-09/0355r0 (Mar. 12, 2009).

* cited by examiner

| FRAME CONTROL | DURATION | RA | TA | SSW | SSW FEEDBACK | FCS |
|---|---|---|---|---|---|---|
| 2 | 2 | 6 | 6 | 3 | 3 | 4 |

OCTETS:

FIG. 3

| DIRECTION | CDOWN | SECTOR ID | DMG ANTENNA ID | RXSS LENGHT |
|---|---|---|---|---|
| 1 | 9 | 6 | 2 | 6 |

B0 / B1 / B9 B10 / B15 B16 / B17 B18 / B23

BITS:

FIG. 4

| B0 | B8 | B9 B10 | B11 B15 | B16 | B17 B23 |
|---|---|---|---|---|---|
| TOTAL SECTORS IN ISS | | NUMBER OF RX DMG ANTENNAS | RESERVED | POLL REQUIRED | RESERVED |

| B0 | B5 | B6 B7 | B8 B15 | B16 | B17 B23 |
|---|---|---|---|---|---|
| SECTOR SELECT | | DMG ANTENNA SELECT | SNR REPORT | POLL REQUIRED | RESERVED |

*FIG. 5*

FIG. 9
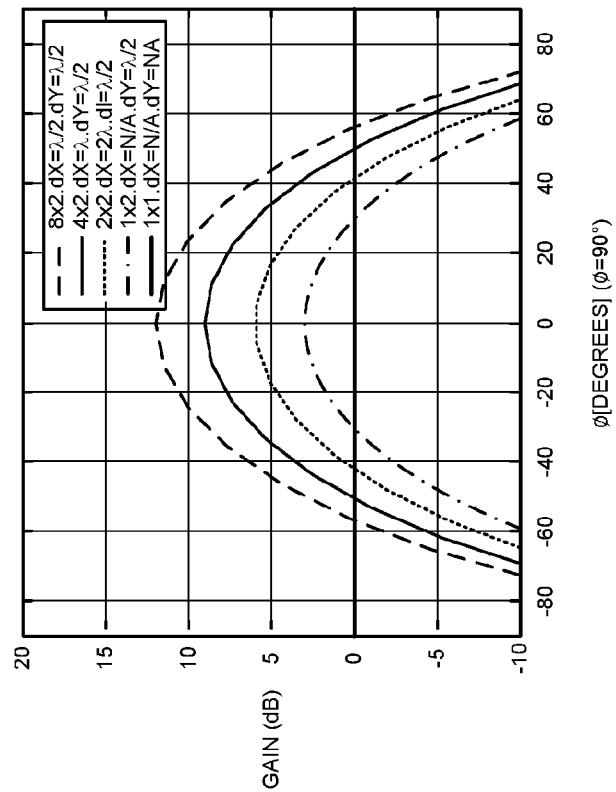
FIG. 10
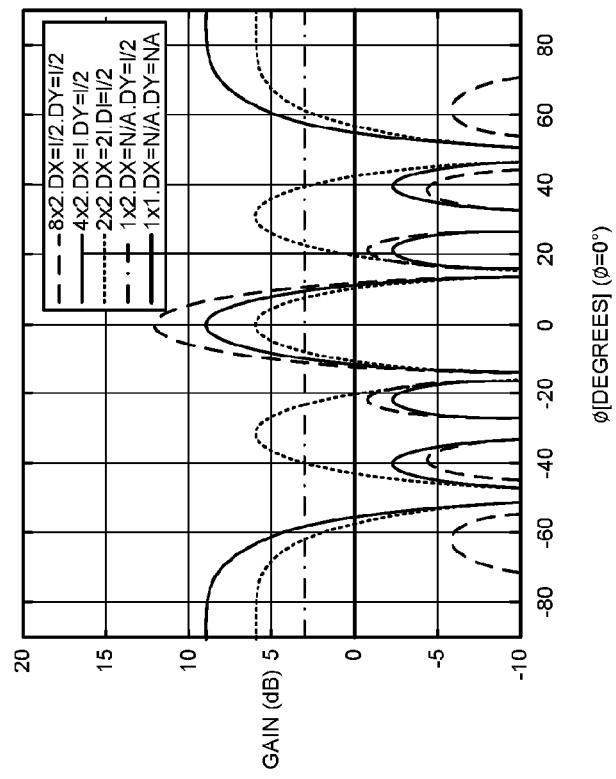

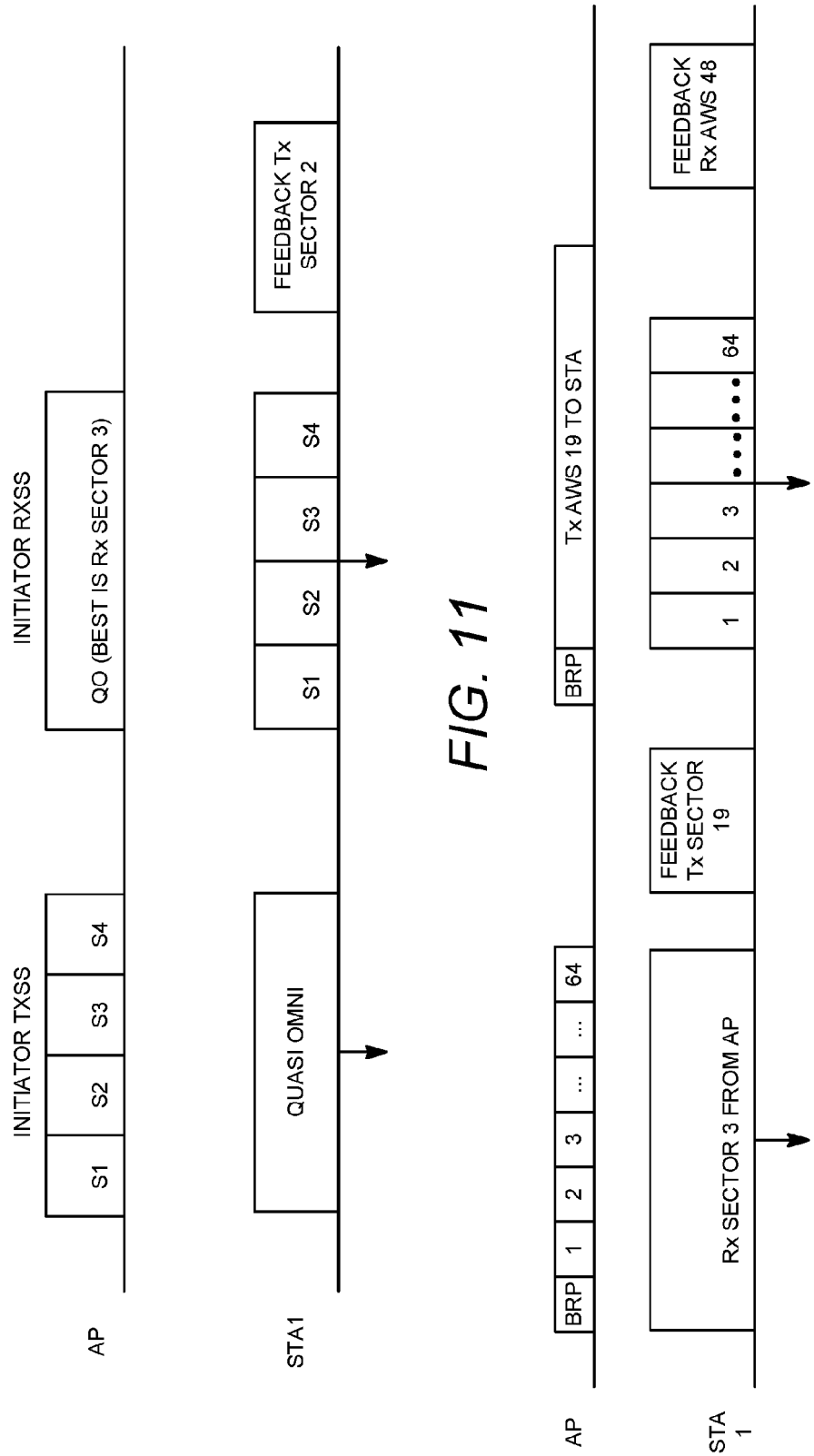

| Sector Index | L1 Index | AWV Index | L2 Index | AWV Index | L3 Index | AWV Index | |
|---|---|---|---|---|---|---|---|
| | | | | | | | |
| 1,2,2,4 | 1 | 1 | | | | | |
| 1,2,2,4 | 1 | 2 | | | | | |
| 1,2,2,4 | 1 | 3 | | | | | |
| 1,2,2,4 | 1 | 4 | | | | | |
| 1,2,2,4 | 1 | 5 | | | | | |
| 1,2,2,4 | 1 | 6 | | | | | |
| 1,2,2,4 | 1 | 7 | | | | | |
| 1,2,2,4 | 1 | 8 | | | | | |
| 1,2,2,4 | 1 | 9 | | | | | |
| 1,2,2,4 | 1 | 10 | | | | | |
| 1,2,2,4 | 1 | 11 | | | | | |
| 1,2,2,4 | 1 | 12 | | | | | |
| 1,2,2,4 | 1 | 13 | | | | | |
| 1,2,2,4 | 1 | 14 | | | | | |
| 1,2,2,4 | 1 | 15 | | | | | |
| 1,2,2,4 | 1 | 16 | | | | | |
| 1,2,2,4 | 2 | 17 | 1 | 17 | 1 | 17 | |
| 1,2,2,4 | 2 | 18 | 1 | 18 | 2 | 18 | |
| 1,2,2,4 | 2 | 19 | 1 | 19 | 3 | 19 | |
| 1,2,2,4 | 2 | 20 | 1 | 20 | 4 | 20 | |
| 1,2,2,4 | 2 | 21 | 2 | 21 | | | |
| 1,2,2,4 | 2 | 22 | 2 | 22 | | | |
| 1,2,2,4 | 2 | 23 | 2 | 23 | | | |
| 1,2,2,4 | 2 | 24 | 2 | 24 | | | |
| 1,2,2,4 | 2 | 25 | 2 | 25 | | | |
| 1,2,2,4 | 2 | 26 | 2 | 26 | | | |
| 1,2,2,4 | 2 | 27 | 2 | 27 | | | |
| 1,2,2,4 | 2 | 28 | 2 | 28 | | | |
| 1,2,2,4 | 2 | 29 | 4 | 29 | | | |
| 1,2,2,4 | 2 | 30 | 4 | 30 | | | |
| 1,2,2,4 | 2 | 31 | 4 | 31 | | | |
| 1,2,2,4 | 2 | 32 | 4 | 32 | | | |

FIG. 20A

| | | | | | | | |
|---|---|---|---|---|---|---|---|
| 1,2,2,4 | 2 | 33 | 1 | 33 | | | |
| 1,2,2,4 | 2 | 34 | 1 | 34 | | | |
| 1,2,2,4 | 2 | 35 | 1 | 35 | | | |
| 1,2,2,4 | 2 | 36 | 1 | 36 | | | |
| 1,2,2,4 | 2 | 37 | 2 | 37 | | | |
| 1,2,2,4 | 2 | 38 | 2 | 38 | | | |
| 1,2,2,4 | 2 | 39 | 2 | 39 | | | |
| 1,2,2,4 | 2 | 40 | 2 | 40 | | | |
| 1,2,2,4 | 2 | 41 | 2 | 41 | | | |
| 1,2,2,4 | 2 | 42 | 2 | 42 | | | |
| 1,2,2,4 | 2 | 43 | 2 | 43 | | | |
| 1,2,2,4 | 2 | 44 | 2 | 44 | | | |
| 1,2,2,4 | 2 | 45 | 4 | 45 | 1 | 45 | |
| 1,2,2,4 | 2 | 46 | 4 | 46 | 2 | 46 | |
| 1,2,2,4 | 2 | 47 | 4 | 47 | 3 | 47 | |
| 1,2,2,4 | 2 | 48 | 4 | 48 | 4 | 48 | |
| 1,2,2,4 | 4 | 49 | | | | | |
| 1,2,2,4 | 4 | 50 | | | | | |
| 1,2,2,4 | 4 | 51 | | | | | |
| 1,2,2,4 | 4 | 52 | | | | | |
| 1,2,2,4 | 4 | 53 | | | | | |
| 1,2,2,4 | 4 | 54 | | | | | |
| 1,2,2,4 | 4 | 55 | | | | | |
| 1,2,2,4 | 4 | 56 | | | | | |
| 1,2,2,4 | 4 | 57 | | | | | |
| 1,2,2,4 | 4 | 58 | | | | | |
| 1,2,2,4 | 4 | 59 | | | | | |
| 1,2,2,4 | 4 | 60 | | | | | |
| 1,2,2,4 | 4 | 61 | | | | | |
| 1,2,2,4 | 4 | 62 | | | | | |
| 1,2,2,4 | 4 | 63 | | | | | |
| 1,2,2,4 | 4 | 64 | | | | | |

*FIG. 20B*

MULTI-RESOLUTION BEAM TRAINING IN MMW WLAN SYSTEMS

CROSS-REFERENCE TO RELATED APPLICATIONS

This application is the U.S. National Stage, under 35 U.S.C. § 371, of International Application No. PCT/US2017/021732 filed Mar. 10, 2017, which claims the benefit of U.S. Provisional Application No. 62/306,446, filed Mar. 10, 2016 and U.S. Provisional Application No. 62/416,883 filed Nov. 3, 2016, the content of which are hereby incorporated by reference herein.

BACKGROUND

A Wireless Local Area Network (WLAN) may have multiple modes of operation, such as an Infrastructure Basic Service Set (BSS) mode and an Independent BSS (IBSS) mode. A WLAN in Infrastructure BSS mode may have an Access Point (AP) for the BSS. One or more wireless transmit receive units (WTRUs), e.g., stations (STAs), may be associated with an AP. An AP may have access or an interface to a Distribution System (DS) or other type of wired/wireless network that carries traffic in and out of a BSS. Traffic to STAs that originates from outside a BSS may arrive through an AP, which may deliver the traffic to the STAs. In certain WLAN systems STA to STA communication may take place. In certain WLAN systems an AP may act in the role of a STA. Beamforming may be used by WLAN devices. Current beamforming techniques may be limited.

SUMMARY

Systems, methods, and instrumentalities are disclosed for multi-resolution training, for example, in millimeter wave (mmW) WLAN systems. In a Multi-Resolution Beam Refinement Protocol (MR-BRP), an access point/PBSS control point (AP/PCP) and a station (STA) may perform multi-resolution beamforming training, for example, by changing a sub-beam resolution or by maintaining sub-beam resolution while changing a resolution of the beamforming training between levels or stages of training. Sub-beam resolution may be changed, for example, by assigning different angular spreads to or by downselecting a number of antenna elements while keeping inter-element spacing constant between levels of training. Resolution of beamforming training may be changed, for example, by downsampling sub-beams or by downsampling antenna elements while adjusting inter-element spacing. Beamforming training (e.g., refinement) levels may refine beams by changing a resolution of antenna weight vectors (AWVs). An AP/PCP and STA may search through a sector multiple times with sub-beams of different resolution to identify a correct pair of sub-beams at a desired resolution. MR-BRP may be used for single or multiple beams, for example, to generate M sub-beams (AWVs) for N beams sequentially or in parallel. MR-BRP may be used for beam tracking. Devices may save the best sub-beam at each level of MR-BRP and may revert (e.g., fall back) to a sub-beam at previous level. MR-BRP signaling may indicate one or more of: MR-BRP capability, type, frame format, etc. Multi-Resolution Sector Level Sweep (MR-SLS) maybe used. Multi-Resolution BRP Implementation may be used (e.g., BRP Inter Frame Separation ("IFS"), Multi-Resolution BRP for multi-beam or multi-channel, and Multi-Resolution BRP for multiuser).

An access point for communicating with a multi-resolution beam refinement protocol (BRP) may include a processor configured (e.g., with executable instructions) for one or more of the following: determine a transmit sector and a receive sector using a sector level sweep; send a first beam refinement protocol (BRP) comprising a first plurality of transmit refinement transaction (TRN-T) subfields, that are associated with at least one of the transmit sector and the receive sector and a subset of available transmit beams; receive a first feedback from a station that indicates a first best transmit beam from the first plurality of TRN-T subfields; down-select beams associated with the transmit sector for a second beam refinement protocol; send the second beam refinement protocol with a second plurality of TRN-T subfields based on the first best transmit beam; and receive a second feedback from the station that indicates a second best transmit beam based on the second beam refinement protocol.

A method of communicating with an access point using a multi-resolution beam refinement protocol (BRP) may include one or more of the following: determining a transmit sector and a receive sector using a sector level sweep; sending a first beam refinement protocol (BRP) comprising a first plurality of transmit refinement transaction (TRN-T) subfields, that are associated with at least one of the transmit sector and the receive sector and a subset of available transmit beams; receiving a first feedback from a station that indicates a first best transmit beam from the first plurality of TRN-T subfields; down-selecting beams associated with the transmit sector for a second beam refinement protocol; sending the second beam refinement protocol with a second plurality of TRN-T subfields based on the first best transmit beam; and receiving a second feedback from the station that indicates a second best transmit beam based on the second beam refinement protocol.

A method of multiresolution beam refinement for multiple beans transmitted between a wireless access point and a plurality of wireless stations may include one or more of the following: performing, in the wireless access point, a wireless access point initiator transmitter sector sweep between the wireless access point and at least one of the plurality of wireless stations; performing, in the wireless access point, a receiver sector sweep for the at least one of the plurality of wireless stations and the wireless access point; determining beam sectors for a first resolution between the access point transmitter and at least one of the plurality of wireless stations receiver; determining beams within the determined beam sectors for the first resolution based on the AWV for each beam within the determined beam sectors; determining a first resolution best beam for each determined sector for the first resolution; determining beam sectors for a second resolution between the access point transmitter and at least one of the plurality of wireless stations receiver; determining beams within the determined beam sectors for the second resolution based on the AWV for each beam within the determined beam sectors; determining a second resolution best beam for each determined sector for the second resolution; and determining a best beam by comparing the first resolution best beam with the second resolution best beam.

A wireless access point for communicating with a plurality of wireless stations using a multiresolution beam refinement for multiple beans transmitted between a wireless access point and a plurality of wireless stations may include a processor configured (e.g., with executable instructions) for one or more of the following: perform, in the wireless access point, a wireless access point initiator transmitter sector sweep between the wireless access point and at least one of the plurality of wireless stations; perform, in the wireless access point, a receiver sector sweep for the at least one of the plurality of wireless stations and the wireless access point; determine beam sectors for a first resolution between the access point transmitter and at least one of the plurality of wireless stations receiver; determine beams within the determined beam sectors for the first resolution based on the AWV for each beam within the determined beam sectors; determine a first resolution best beam for each determined sector for the first resolution; determine beam sectors for a second resolution between the access point transmitter and at least one of the plurality of wireless stations receiver; determine beams within the determined beam sectors for the second resolution based on the AWV for each beam within the determined beam sectors; determine a second resolution best beam for each determined sector for the second resolution; and determine a best beam by comparing the first resolution best beam with the second resolution best beam.

BRIEF DESCRIPTION OF THE DRAWINGS

FIG. 3 is an example format for a sector sweep (SSW) frame.

FIG. 4 is an example format for an SSW field in an SSW frame.

FIG. 5 is an example of an SSW feedback field in an SSW frame.

FIG. 9 is an example of antenna element down-sampling.

FIG. 10 is an example of a 2-D beam pattern where central lobe beamwidth remains constant while antenna gain and directivity may be reduced due to side-lobes with antenna element down-selection.

FIG. 11 is an example of a sector level sweep (SLS).

FIG. 12 is an example of a beam refinement protocol (BRP).

FIGS. 20A and 20B are an example table illustrating a 3-level MR-BRP index selection where a Tx sector is beam 19 (Sector 1, 2, 2, 3) and an Rx sector is beam 48 (Sector 3, 3, 4, 4).

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
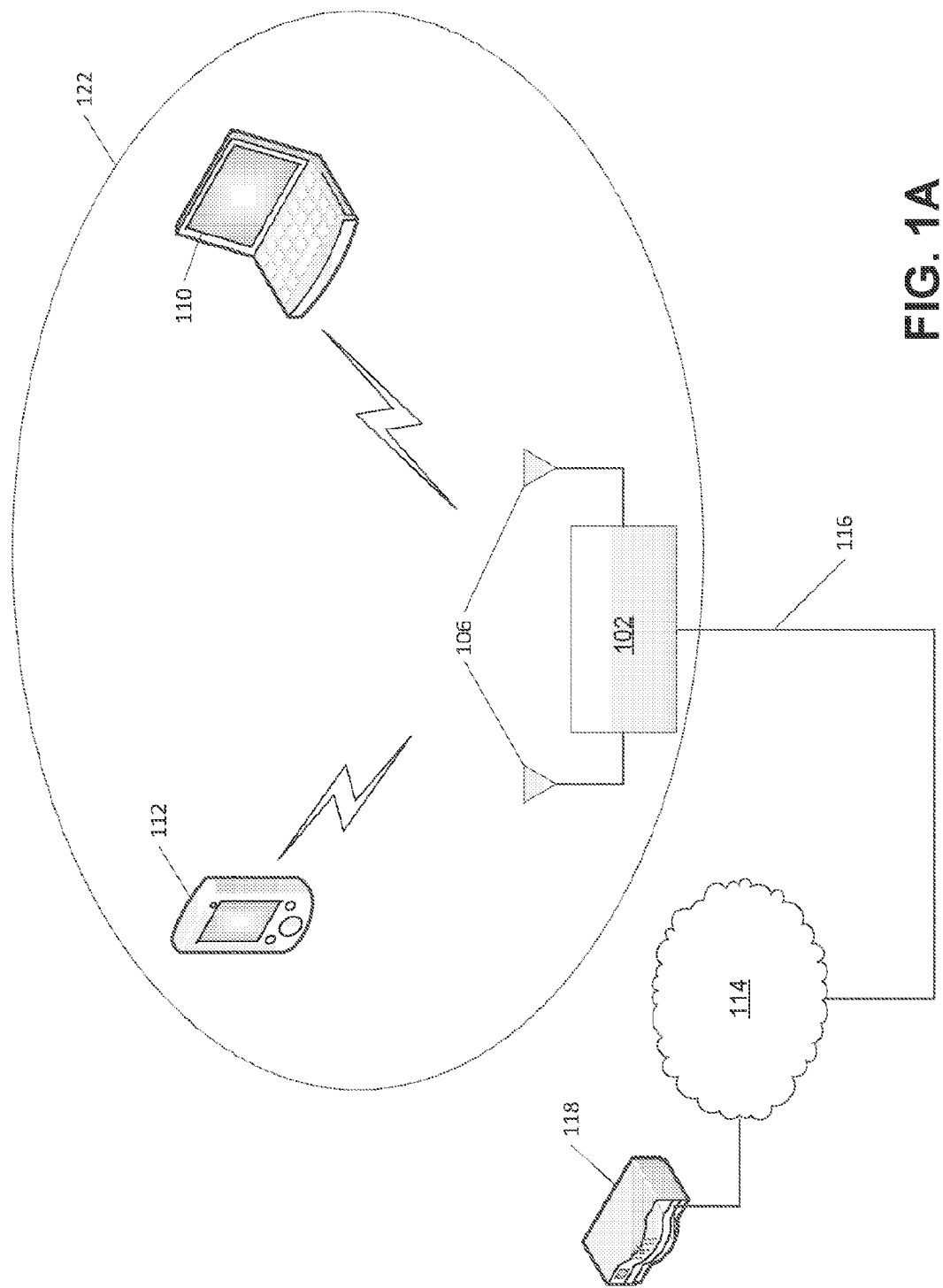
FIG. 1A illustrates exemplary wireless local area network (WLAN) devices.

FIG. 1A illustrates exemplary wireless local area network (WLAN) devices. One or more of the devices may be used to implement one or more of the features described herein. The WLAN may include, but is not limited to, access point (AP) 102, station (STA) 110, and STA 112. STA 110 and 112 may be associated with AP 102. The WLAN may be configured to implement one or more protocols of the IEEE 802.11 communication standard, which may include a channel access scheme, such as DSSS, OFDM, OFDMA, etc. A WLAN may operate in a mode, e.g., an infrastructure mode, an ad-hoc mode, etc.

A WLAN operating in an infrastructure mode may comprise one or more APs communicating with one or more associated STAs. An AP and STA(s) associated with the AP may comprise a basic service set (BSS). For example, AP 102, STA 110, and STA 112 may comprise BSS 122. An extended service set (ESS) may comprise one or more APs (with one or more BSSs) and STA(s) associated with the APs. An AP may have access to, and/or interface to, distribution system (DS) 116, which may be wired and/or wireless and may carry traffic to and/or from the AP. Traffic to a STA in the WLAN originating from outside the WLAN may be received at an AP in the WLAN, which may send the traffic to the STA in the WLAN. Traffic originating from a STA in the WLAN to a destination outside the WLAN, e.g., to server 118, may be sent to an AP in the WLAN, which may send the traffic to the destination, e.g., via DS 116 to network 114 to be sent to server 118. Traffic between STAs within the WLAN may be sent through one or more APs. For example, a source STA (e.g., STA 110) may have traffic intended for a destination STA (e.g., STA 112). STA 110 may send the traffic to AP 102, and, AP 102 may send the traffic to STA 112.

A WLAN may operate in an ad-hoc mode. The ad-hoc mode WLAN may be referred to as independent basic service set (IBBS). In an ad-hoc mode WLAN, the STAs may communicate directly with each other (e.g., STA 110 may communicate with STA 112 without such communication being routed through an AP).

IEEE 802.11 devices (e.g., IEEE 802.11 APs in a BSS) may use beacon frames to announce the existence of a WLAN network. An AP, such as AP 102, may transmit a beacon on a channel, e.g., a fixed channel, such as a primary channel. A STA may use a channel, such as the primary channel, to establish a connection with an AP.

STA(s) and/or AP(s) may use a Carrier Sense Multiple Access with Collision Avoidance (CSMA/CA) channel access mechanism. In CSMA/CA a STA and/or an AP may sense the primary channel. For example, if a STA has data to send, the STA may sense the primary channel. If the primary channel is detected to be busy, the STA may back off. For example, a WLAN or portion thereof may be configured so that one STA may transmit at a given time, e.g., in a given BSS. Channel access may include RTS and/or CTS signaling. For example, an exchange of a request to send (RTS) frame may be transmitted by a sending device and a clear to send (CTS) frame that may be sent by a receiving device. For example, if an AP has data to send to a STA, the AP may send an RTS frame to the STA. If the STA is ready to receive data, the STA may respond with a CTS frame. The CTS frame may include a time value that may alert other STAs to hold off from accessing the medium while the AP initiating the RTS may transmit its data. On receiving the CTS frame from the STA, the AP may send the data to the STA.

A device may reserve spectrum via a network allocation vector (NAV) field. For example, in an IEEE 802.11 frame, the NAV field may be used to reserve a channel for a time period. A STA that wants to transmit data may set the NAV to the time for which it may expect to use the channel. When a STA sets the NAV, the NAV may be set for an associated WLAN or subset thereof (e.g., a BSS). Other STAs may count down the NAV to zero. When the counter reaches a value of zero, the NAV functionality may indicate to the other STA that the channel is now available.

The devices in a WLAN, such as an AP or STA, may include one or more of the following: a processor, a memory, a radio receiver and/or transmitter (e.g., which may be combined in a transceiver), one or more antennas (e.g., antennas 106 in FIG. 1A), etc. A processor function may comprise one or more processors. For example, the processor may comprise one or more of: a general purpose processor, a special purpose processor (e.g., a baseband processor, a MAC processor, etc.), a digital signal processor (DSP), Application Specific Integrated Circuits (ASICs), Field Programmable Gate Array (FPGAs) circuits, any other type of integrated circuit (IC), a state machine, and the like.

The one or more processors may be integrated or not integrated with each other. The processor (e.g., the one or more processors or a subset thereof) may be integrated with one or more other functions (e.g., other functions such as memory). The processor may perform signal coding, data processing, power control, input/output processing, modulation, demodulation, and/or any other functionality that may enable the device to operate in a wireless environment, such as the WLAN of FIG. 1A. The processor may be configured to execute processor executable code (e.g., instructions) including, for example, software and/or firmware instructions. For example, the processer may be configured to execute computer readable instructions included on one or more of the processor (e.g., a chipset that includes memory and a processor) or memory. Execution of the instructions may cause the device to perform one or more of the functions described herein.

A device may include one or more antennas. The device may employ multiple input multiple output (MIMO) techniques. The one or more antennas may receive a radio signal. The processor may receive the radio signal, e.g., via the one or more antennas. The one or more antennas may transmit a radio signal (e.g., based on a signal sent from the processor).

The device may have a memory that may include one or more devices for storing programming and/or data, such as processor executable code or instructions (e.g., software, firmware, etc.), electronic data, databases, or other digital information. The memory may include one or more memory units. One or more memory units may be integrated with one or more other functions (e.g., other functions included in the device, such as the processor). The memory may include a read-only memory (ROM) (e.g., erasable programmable read only memory (EPROM), electrically erasable programmable read only memory (EEPROM), etc.), random access memory (RAM), magnetic disk storage media, optical storage media, flash memory devices, and/or other non-transitory computer-readable media for storing information. The memory may be coupled to the processer. The processer may communicate with one or more entities of memory, e.g., via a system bus, directly, etc.

Figure 1B:
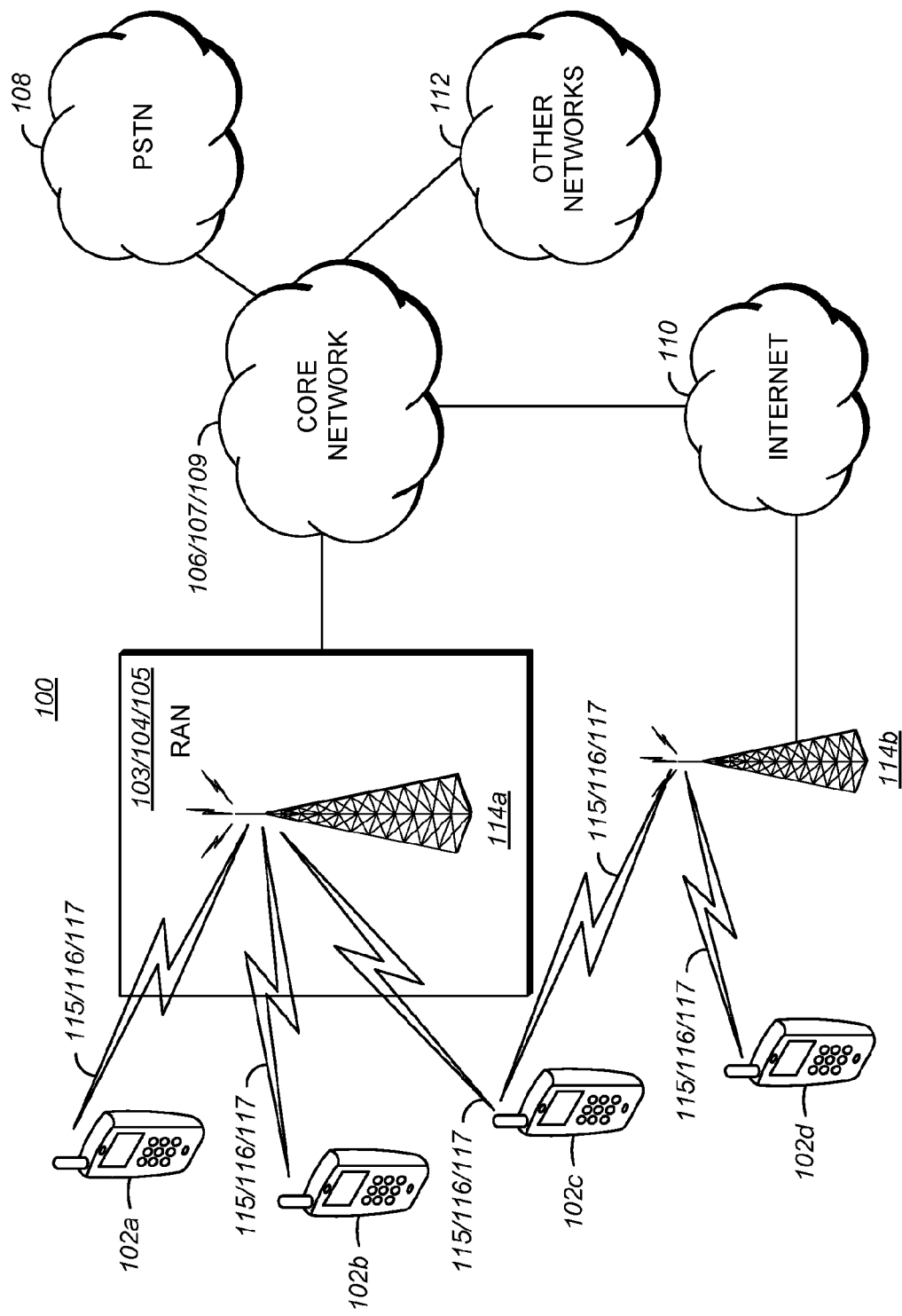
FIG. 1B is a diagram of an example communications system in which one or more disclosed features may be implemented.

FIG. 1B is a diagram of an example communications system 100 in which one or more disclosed features may be implemented. For example, a wireless network (e.g., a wireless network comprising one or more components of the communications system 100) may be configured such that bearers that extend beyond the wireless network (e.g., beyond a walled garden associated with the wireless network) may be assigned QoS characteristics.

The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1B, the communications system 100 may include at least one wireless transmit/receive unit (WTRU), such as a plurality of WTRUs, for instance WTRUs 102a, 102b, 102c, and 102d, a radio access network (RAN) 104, a core network 106, a public switched telephone network (PSTN) 108, the Internet 110, and other networks 112, though it should be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station (e.g., a WLAN STA), a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it should be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1B may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN), In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1B, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1B, it should be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1B may be configured to communicate with the base station 114a, which may employ a cellular-based radio technology, and with the base station 114b, which may employ an IEEE 802 radio technology.

Figure 1C:
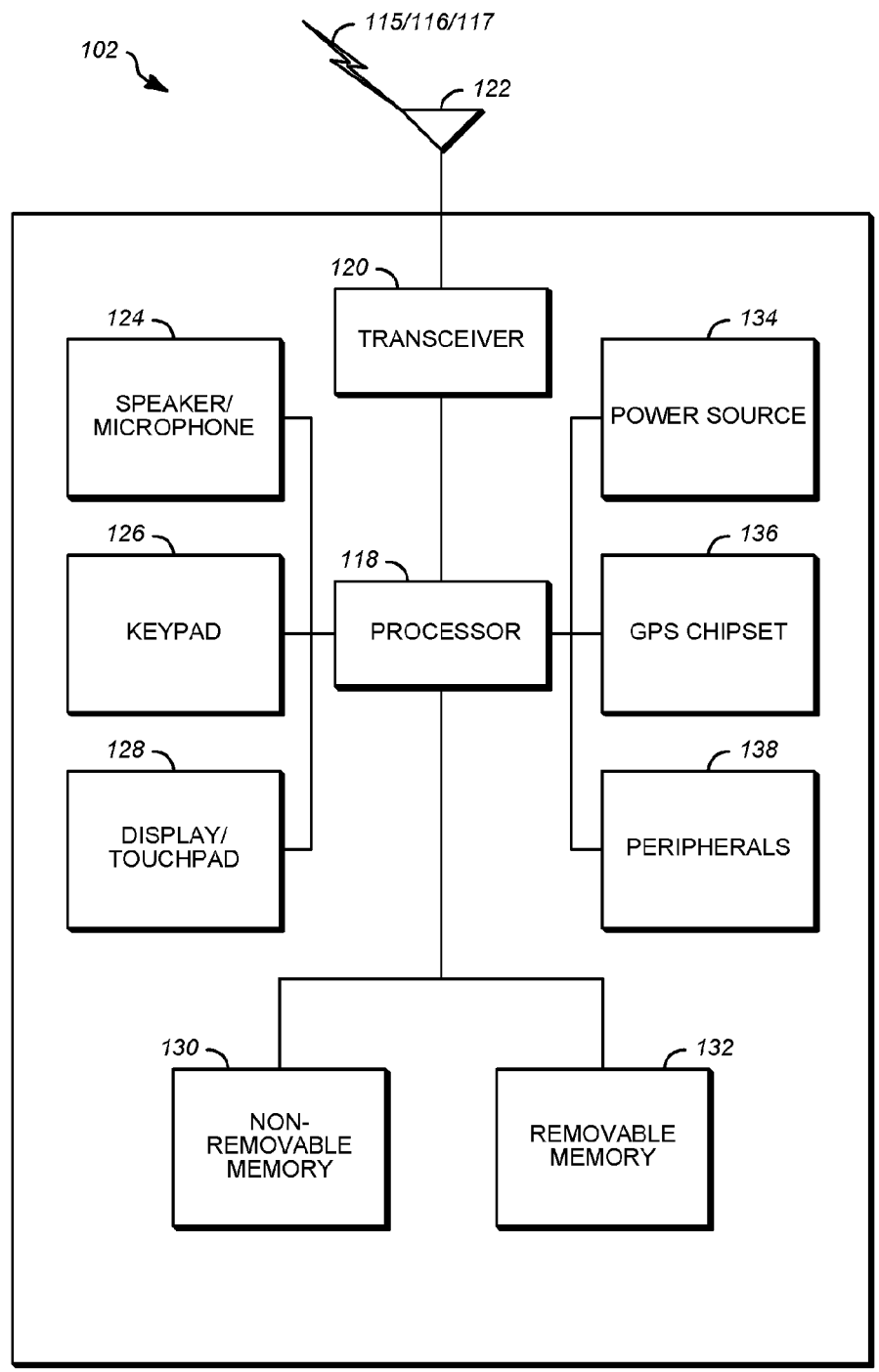
FIG. 1C depicts an exemplary wireless transmit/receive unit, WTRU.

FIG. 1C depicts an exemplary wireless transmit/receive unit, WTRU 102. A WTRU may be a user equipment (UE), a mobile station, a WLAN STA, a fixed or mobile subscriber unit, a pager, a cellular telephone, a personal digital assistant (PDA), a smartphone, a laptop, a netbook, a personal computer, a wireless sensor, consumer electronics, and the like. WTRU 102 may be used in one or more of the communications systems described herein. As shown in FIG. 1C, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It should be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1C depicts the processor 118 and the transceiver 120 as separate components, it should be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It should be appreciated that the transmit/receive element 122 may be configured to transmit and/or receive any combination of wireless signals.

In addition, although the transmit/receive element 122 is depicted in FIG. 1C as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It should be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Systems, methods, and instrumentalities are disclosed for multi-resolution training, for example, in millimeter wave (mmW) WLAN systems. In a Multi-Resolution Beam Refinement Protocol (MR-BRP), an access point (AP)/PBSS control point (PCP) and a station (STA) may perform multi-resolution beamforming training, for example, by changing a sub-beam resolution or by maintaining sub-beam resolution while changing a resolution of the beamforming training between levels or stages of training. Sub-beam resolution may be changed, for example, by assigning different angular spreads to or by downselecting a number of antenna elements while keeping inter-element spacing constant between levels of training. Resolution of beamforming training may be changed, for example, by downsampling sub-beams or by downsampling antenna elements while adjusting inter-element spacing. Beamforming training (e.g., refinement) levels may refine beams by changing a resolution of antenna weight vectors (AWVs). An AP/PCP and STA may search through a sector multiple times with sub-beams of different resolution to identify a correct pair of sub-beams at a desired resolution. MR-BRP may be used for single or multiple beams, for example, to generate M sub-beams (AWVs) for N beams sequentially or in parallel. MR-BRP may be used for beam tracking. Devices may save the best sub-beam at each level of MR-BRP and may revert (fall back) to a sub-beam at previous level. MR-BRP signaling may indicate MR-BRP capability, type, frame format, etc.

A WLAN may have an Infrastructure Basic Service Set (BSS) mode that may have an Access Point (AP/PCP) for the BSS and one or more stations (STAs) associated with the AP/PCP. The AP/PCP may have an access or interface to a Distribution System (DS) or another type of wired/wireless network that may carry traffic in and out of the BSS. Traffic to STAs that may originate from outside the BSS may arrive through the AP/PCP and may be delivered to the STAs. Traffic that may originate from STAs to destinations outside the BSS may be sent to the AP/PCP and may be delivered to the respective destinations. Traffic between STAs within the BSS may also be sent through the AP/PCP where the source STA may send traffic to the AP/PCP and the AP/PCP may deliver the traffic to the destination STA. Traffic between STAs within a BSS may be peer-to-peer traffic. Peer-to-peer traffic may be sent between the source and destination STAs with a direct link setup (DLS) using an 802.11e DLS or an 802.11z tunneled DLS (TDLS) and may be sent directly. A WLAN may use an Independent BSS (IBSS) mode and may have no AP/PCP, and/or STAs, and may communicate directly with another WLAN. This mode of communication may be referred to as an "ad-hoc" mode of communication.

The AP/PCP may use the 802.11ac infrastructure mode of operation. The AP/PCP may transmit a beacon and may do so on a fixed channel. The fixed channel may be the primary channel. The channel may be 20 MHz wide and may be the operating channel of the BSS. The channel may be used by the STAs and may be used to establish a connection with the AP/PCP. The fundamental channel access mechanism in an 802.11 system may be Carrier Sense Multiple Access with Collision Avoidance (CSMA/CA). In CSMA/CA, a STA (e.g., every STA), including the AP/PCP, may sense the primary channel. The channel may be detected to be busy. The STA may back off and may back off if the channel is detected to be busy. One STA may transmit at any given time in a given BSS (e.g., using CSMA/CA).

In 802.11n, High Throughput (HT) STAs may also use a 40 MHz wide channel for communication. This may be achieved by combining the primary 20 MHz channel, with an adjacent 20 MHz channel to form a 40 MHz wide contiguous channel.

In 802.11ac, Very High Throughput (VHT) STAs may support 20 MHz, 40 MHz, 80 MHz, and 160 MHz wide channels. The 40 MHz, and 80 MHz, channels may be formed by combining contiguous 20 MHz channels similar to 802.11n described above. A 160 MHz channel may be formed by combining 8 contiguous 20 MHz channels or by combining two non-contiguous 80 MHz channels. This may be referred to as an 80+80 configuration. For the 80+80 configuration, the data may be channel encoded and may be passed through a segment parser (e.g., after channel encoding). The segment parser may divide the data into streams (e.g., two streams). IFFT and/or time domain processing may be done on a stream (e.g., on each stream separately). The streams may be mapped on to a channel (e.g., each stream to a channel, e.g., two streams to two channels). The data may be transmitted. At the receiver, the mechanism may be reversed, and the combined data may be sent to the MAC.

Sub 1 GHz modes of operation are supported by 802.11af and 802.11ah. For these specifications the channel operating bandwidths, and carriers, are reduced relative to those used in 802.11n and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. A possible use case for 802.11ah is support for Meter Type Control (MTC) devices in a macro coverage area. MTC devices may have limited capabilities including support for limited bandwidths. MTC devices may include a requirement for a long battery life.

WLAN systems which support multiple channels, and channel widths, such as 802.11n, 802.11ac, 802.11af, and 802.11ah, include a channel which is designated as the primary channel. The primary channel may have a bandwidth equal to or about equal to the largest common operating bandwidth supported by the STAs (e.g., all STAs) in the BSS. The bandwidth of the primary channel may be limited by the STA (e.g., of all STAs in operating in the BSS) and may be limited by the STA which supports the smallest bandwidth operating mode. In the example of 802.11ah, the primary channel may be 1 MHz wide if there are STAs (e.g., MTC type devices) that support (e.g., only support) a 1 MHz mode (e.g., even if the AP/PCP, and other STAs in the BSS, may support a 2 MHz, 4 MHz, 8 MHz, 16 MHz, or other channel bandwidth operating modes). Carrier sensing and NAV settings may depend on the status of the primary channel (e.g., if the primary channel is busy, e.g., due to a STA supporting only a 1 MHz operating mode is transmitting to the AP/PCP, then the available frequency bands (e.g., entire available frequency bands) are considered busy even though the frequency bands (e.g., majority of frequency bands) are idle and available.

In the United States, the available frequency bands which may be used by 802.11ah are from 902 MHz to 928 MHz. In Korea the available frequency bands which may be used are from 917.5 MHz to 923.5 MHz; and in Japan, the available frequency bands which may be used are from 916.5 MHz to 927.5 MHz. The total bandwidth available for 802.11ah is 6 MHz to 26 MHz depending on the country code.

802.11ac has the concept of downlink Multi-User MIMO (MU-MIMO) transmission to multiple STA's in the same symbol's time frame, e.g., during a downlink OFDM symbol. Downlink MU-MIMO may be used in 802.11ah. Downlink MU-MIMO, (e.g., as it is used in 802.11ac), may use the same symbol timing to multiple STA's. Interference of the waveform transmissions to multiple STA's may not be an issue. STA's involved in MU-MIMO transmission (e.g., all the STA's) with the AP/PCP may (e.g., must) use the same channel or band. The operating bandwidth may be the smallest channel bandwidth that is supported by the STA's which are included in the MU-MIMO transmission with the AP/PCP.

802.11ad is an amendment to the WLAN standard, which specifies the MAC and PHY layers for very high throughput (VHT) in the 60 GHz band. 802.11ad may support data rates up to 7 Gbits/s. 802.11ad may support three different modulation modes (e.g., control PHY with single carrier and spread spectrum, single carrier PHY, and OFDM PHY).

802.11ad may use a 60 GHz unlicensed band and/or a band that is available globally. At 60 GHz, the wavelength is 5 mm, Compact and antenna or antenna arrays may be used with 60 GHz. An antenna may create narrow RF beams (e.g., at both transmitter and receiver). The narrow RF beams may effectively increase the coverage range and may reduce the interference. The frame structure of 802.11ad may facilitate a mechanism for beamforming training (e.g., discovery and tracking). The beamforming training protocol may comprise two components: a sector level sweep (SLS) procedure and a beam refinement protocol (BRP) procedure. The SLS procedure may be used for transmit beamforming training. The BRP procedure may enable receive beamforming training and may refine (e.g., iteratively) the transmit and/or receive beams. MIMO transmissions (e.g., SU-MIMO and MU-MIMO) may not be supported by 802.11ad.

Figure 2:
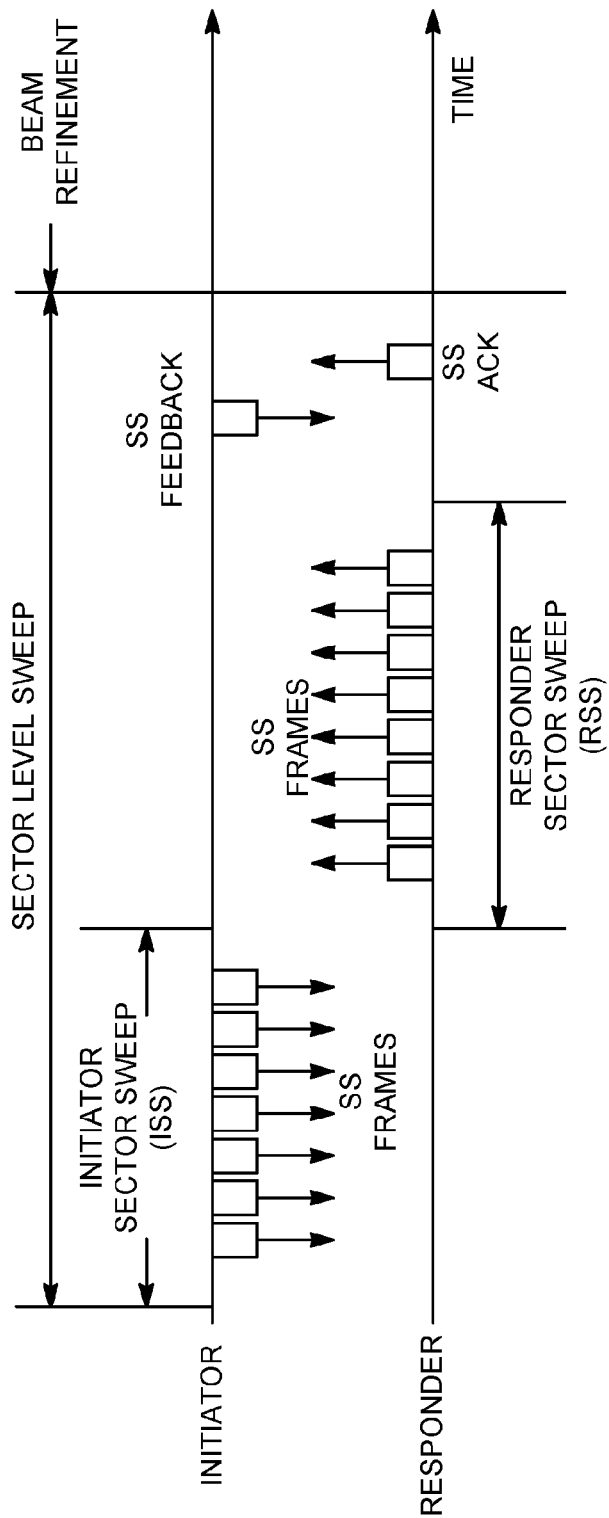
FIG. 2 is an example of sector level sweep (SLS) training.

FIG. 2 is an example of sector level sweep ("SLS") training. SLS training may be performed using a Beacon frame or an SSW frame. When the Beacon frame is utilized, the AP/PCP may repeat the Beacon frame with multiple beams/sectors within each Beacon interval (BI) and multiple STAs can perform BF training simultaneously. The AP/PCP may not be able to sweep all the sectors/beams within one BI (e.g., due to the size of the Beacon frame). A STA may wait BIs (e.g., multiple BIs) to complete ISS training. Latency may be an issue. An SSW frame may be utilized (e.g., for point to point BF training). An SSW frame may be transmitted (e.g., using control PHY), for example, using the SSW frame format shown in FIG. 3.

FIG. 3 is an example format for a selection sector sweep (SSW) frame. FIG. 4 is an example format for an SSW field in an SSW frame. FIG. 5 is an example of an SSW feedback field in an SSW frame.

Figure 6:
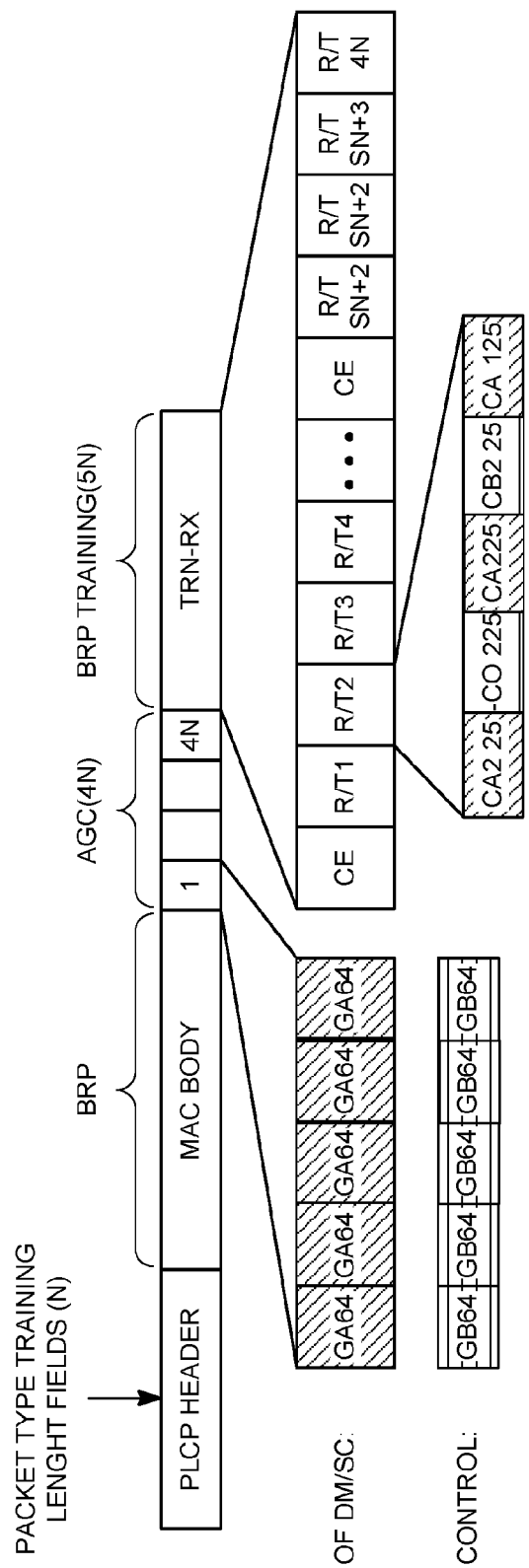
FIG. 6 is an example PLCP Protocol Data Unit (PPDU) carrying a beam refinement protocol (BRP) frame and training (TRN) fields.

FIG. 6 is an example PLCP Protocol Data Unit (PPDU) carrying a beam refinement protocol (BRP) frame and training (TRN) fields. Beamforming Refinement Protocol (BRP) is a process where a STA can improve its antenna configuration (or antenna weight vectors) (e.g., for transmission and reception). In the beam refinement procedure, BRP packets may be used to train the receiver and/or transmitter antenna. There are two types of BRP packets: BRP-RX packets (e.g., beamforming refinement protocol receiver) and BRP-TX (e.g. beamforming refinement protocol transmitter) packets. A BRP packet may be carried by a DMG PPDU and may be followed by a training field. The training field may contain an AGC field and may contain a transmitter or receiver training field, for example, as shown in FIG. 6.

A value of N in FIG. 6 may be the Training Length (e.g., training length given in the header filed). The training length may indicate that the AGC has 4N subfields and may indicate that the TRN-R/T field has 5N subfields. The CE subfield may the same as or similar to the one in the preamble. Subfields (e.g., all subfields) in the beam training field are transmitted using rotated 7/2-BPSK modulation. A BRP MAC frame is an Action No ACK frame and may have one or more of the following fields: Category, Unprotected DMG Action, Dialog Token, BRP Request field, DMG Beam Refinement element, Channel Measurement Feedback element 1 to Channel Measurement Feedback element k.

The IEEE 802.11ay physical layer (PHY) and the IEEE 802.11ay medium access control layer (MAC) may have at least one mode of operation capable of supporting a maximum throughput of at least 20 gigabits per second (measured at the MAC data service access point) and may maintain or improve the power efficiency (e.g., per station). The IEEE 802.11ay physical layer (PHY) and the IEEE 802.11ay medium access control layer (MAC) may have license-exempt bands above 45 GHz that may have backward compatibility and/or may be coexistence with directional multi-gigabit stations (e.g., legacy, e.g., defined by IEEE 802.11ad-2012 amendment) operating in the same band. 802.11ay may operate in the same band as legacy standards. There may be backward compatibility and/or coexistence with legacies in the same band.

Beamforming (BF) training procedures (e.g., under 802.11ad) may achieve good performance, for example, when both initiator and responder train their transmitter/receiver beams, respectively. BF training may involve, for example, four training periods. A (e.g., each) training period may involve training and measurement on multiple beams. Efficient BF training procedures may reduce training, reduce latency, and increase efficiency during a beamforming refinement procedure.

BF training procedures may be performed for single beam/single stream transmission and for multiple beams to enable multi-beam transmission.

Repeated beam tracking may occur, for example, when the beam width of sub-beams is too narrow. Beam width of sub-beams may be too narrow, for example, when a channel is changing (e.g., due to movement of a station (STA), access point (AP)/PBSS control point (PCP) or environment). Beams may be modified, for example, to reduce the amount of tracking and tracking overhead.

A multi-resolution beam refinement protocol (MR-BRP) may be applied to single beams. An AP/PCP and STAs may refine beams in a manner that reduces tracking time, for example, by (e.g., continually) changing the resolution of antenna weight vectors (AWV) used in each BRP stage.

An AP/PCP and STA may identify a (e.g., the best) transmit and receive sector, for example, based on a sector level sweep (SLS). A BRP procedure may (e.g., exhaustively) search AWVs within a sector, e.g., to identify the best transmit and receive AWVs for a AP/PCP/STA pair. An (e.g., each) AWV may correspond to a specific boresight direction for a device.

An AP/PCP and STA may (e.g., in a multi-resolution BRP procedure) search through a sector multiple times with sub-beams of different resolution, e.g., until a correct pair of narrow sub-beams at the desired resolution are identified, which may be an alternative to exhaustively searching over narrow sector sub-beams.

Sub-beams may be created by a variety of implementations. One or more of the following may apply.

For sub-beam creation, an AP/PCP or STA may define sub-beams by multiple AWV "codebooks." Elements of each codebook may span a different angular spread, thereby changing the resolution of each sub-beam. For example, AWVs corresponding to sub-beams in codebook level 1 may have an angular spread of 22.5 degrees, level 2 may have an angular spread of 5.625 degrees, level 3 may have an angular spread of 1.046 degrees and so on. This example is illustrated in examples shown in FIGS. 17-19. Angles presented in examples are exemplary and without limitation. For example, codebook level 1 may have sub-beams with angular spreads of 45 degrees while codebook level 2 may have sub-beams with angular spreads of 11.25 degrees. Sub-beams of lower level(s) in a codebook that should be used may be inferred, for example, when sub-beams for a specific level are identified.

For sub-beam creation, an AP/PCP or STA may down-sample sub-beams in a sector. AP/PCP or STA may select down-sampled sub-beams with the best performance. Resolution of sub-beams may be maintained (e.g., the same)

while changing the resolution of a refinement procedure. Additional iterations may select sub-beams "close" to a selected sub-beam for further analysis, which may be performed, for example, by selecting a sub-set of AWVs in a "codebook."

Figure 7:
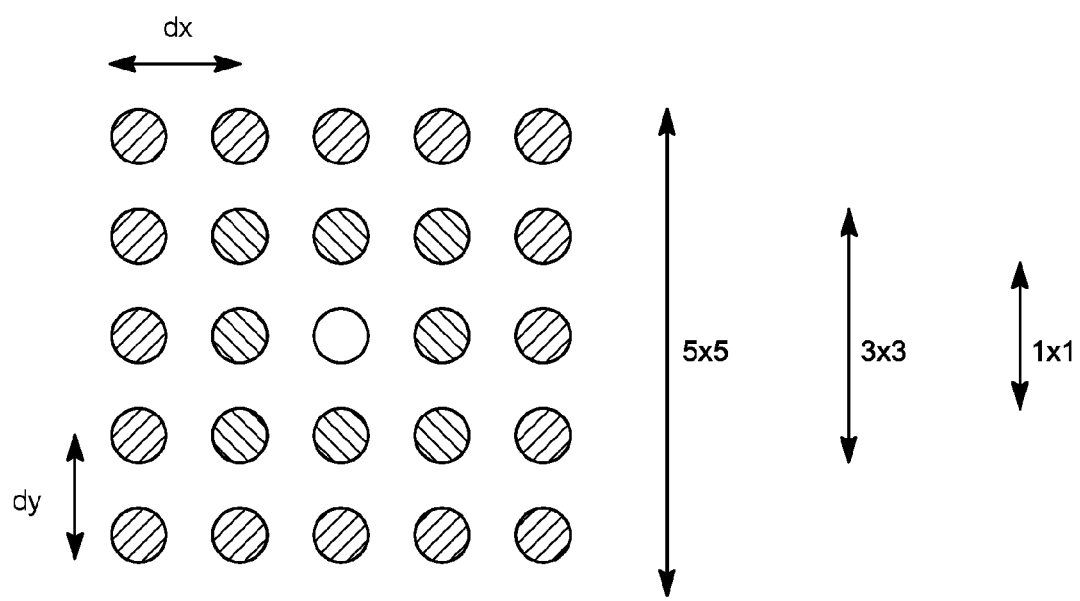
FIG. 7 is an example of antenna down-selection.
Figure 8:
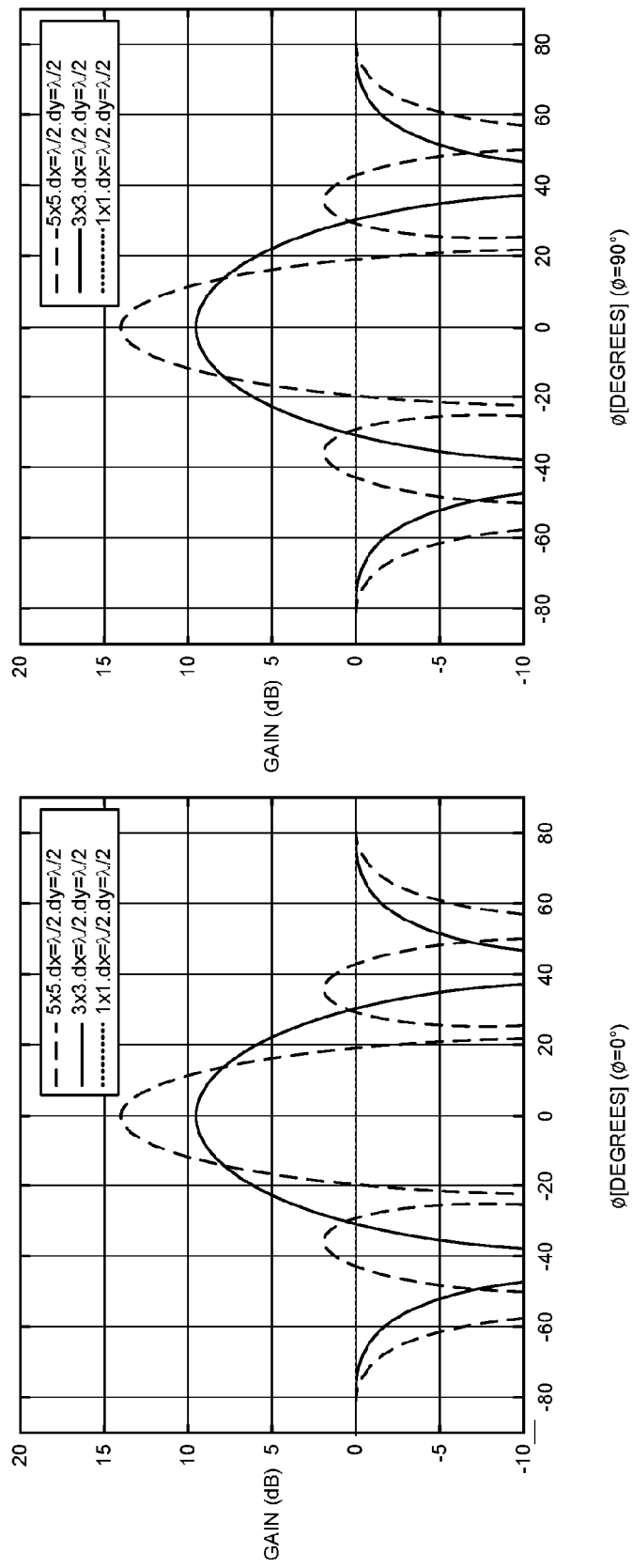
FIG. 8 is an example of a 2-D beam pattern where beam width increases with antenna element down-selection.

FIG. 7 is an example of antenna down-selection. FIG. 8 is an example of a 2-D beam pattern where beam width increases with antenna element down-selection.

For sub-beam creation, e.g., associated with the examples shown in FIGS. 7 and 8, an AP/PCP or STA may adjust the resolution of sub-beams by down-selecting the number of antenna elements excited in Physical Antenna Arrays (PAA) while keeping inter-element spacing constant. A beamwidth of the antenna response may increase, for example, with increasing down-selection.

FIG. 9 is an example of antenna element down-sampling. FIG. 10 is an example of a 2-D beam pattern where central lobe beamwidth remains constant while antenna gain and directivity may be reduced due to side-lobes with antenna element down-selection.

For sub-beam creation, e.g., associated with the examples shown in FIGS. 9 and 10, an AP/PCP or STA may down-sample sub-beams in a sector by down-sampling the number of antenna elements excited in the PAA while adjusting the inter-element spacing of the antennas. The resolution of the sub-beams may remain constant while the resolution of the refinement procedure may change. The beamwidth of the central lobe of a sub-beam may remain constant while antenna gain and directivity may be reduced, e.g., due to additional side lobes.

Creation of sub-beams may be accomplished with different multi-resolution procedures.

Multi-resolution examples may be used in a sector level sweep (SLS). Subsequent SLSs may use wider or narrower sector resolutions, e.g., as needed.

Sub-beams may be created, for example, by an MR-BRP with different sub-beam resolutions. In an example, it may be assumed that there is no antenna reciprocity, that the AP/PCP may estimate the best transmit sub-beam for the AP/PCP and may receive a sub-beam for the STA assuming a forward link transmission. Modifications may be implemented to account for the presence of reciprocity. A responder Tx MR-BRP may serve as the best Rx of the initiator. MR-BRP with different sub-beam resolutions may be suitable, for example, for sub-beam creation examples herein.

It may be assumed that the AP/PCP and STAs have 256 sub-beams with each sector transmitter/receiver spanning 64 sub-beams. An exhaustive search BRP may require 64 TRN-T and 64 TRN-R training fields and two feedback transmissions to identify the correct pair of sub-beams at the transmitter.

In an example of a multi-resolution procedure using different resolutions, PAA beamwidths may be set, for example, so that at any one time there are (e.g., only) four TRN-T/TRN-R training fields that span the overall sector of interest being tested. This may be repeated until the correct pair of sub-beams with the desired resolution are identified. In an example, there may be 24 TRN-T/TRN-R training fields transmitted with four feedback transmissions to identify the correct pair of beams at the transmitter. Training and feedback may be adjusted, e.g., to satisfy latency requirements. At an (e.g., any) intermediate resolution level, transmission of data may occur (e.g., with some impact on the gain), for example, when data needs to be sent. A sub-beam may be referred to as an antenna weight vector (AWV).

An example procedure for MR-BRP with different sub-beam resolutions may be provided. One or more of the following may be performed.

An AP/PCP and STA(s) may provide an indication that they are capable of multi-resolution BRP, e.g., to ensure the STA may operate properly in the network. The AP/PCP and STA(s) may negotiate the multi-radio levels that they use. The AP/PCP and STA may use different resolutions.

Figure 16:
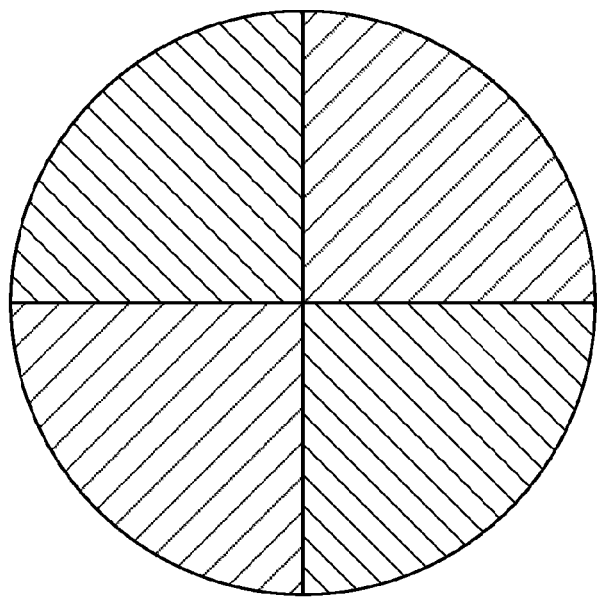
FIG. 16 is an example of a sector level sweep (SLS) to identify a sector with an angular spread of 90 degrees.

FIG. 11 is an example of a sector level sweep (SLS). FIG. 16 is an example of a sector level sweep (SLS) to identify a sector with an angular spread of 90 degrees. The AP/PCP and STA may go through an initiator transmit sector sweep (TXSS) and initiator receive sector sweep (RXSS) procedure. In the initiator TXSS, the AP/PCP may transmit and cycle through its sectors (see, e.g., example shown in FIG. 16 illustrating four sectors 1-4). STA antennas may be set as quasi-omni. In the initiator RXSS, the AP/PCP may transmit as quasi-omni. The STA may cycle through its receive sectors. The STA may feedback a (e.g., the best) sector to the AP/PCP.

FIG. 12 is an example of a beam refinement protocol (BRP), which may be used for legacy BRP. FIGS. 20A and 20B are an example table illustrating a 3-level MR-BRP index selection where a Tx sector is beam 19 (Sector 1, 2, 2, 3) and an Rx sector is beam 48 (Sector 3, 3, 4, 4), although FIGS. 20A and 20B may also be referenced for BRP, An AP/PCP may send a transmit BRP frame with transmit training (TRN-T) subfields. In an example, the AP/PCP may send 64 TRN-T fields to the STA (e.g., see the example in FIG. 19). The STA may set its receive sector to that identified in the SLS (see, e.g., sector 3 in the example shown in FIGS. 20A and 20B). The STA may (e.g., based on the transmit BRP) feedback a (e.g., the best) AWV to the AP/PCP. The STA may request receiver beam refinement (e.g., Tx AWV 19 in example in FIGS. 20A and 20B). The AP/PCP may send a BRP to the STA with 64 TRN-R fields to the STA. The AP/PCP may transmit based on the transmit AWV refinement step (e.g., Tx AWV 19). The STA may feedback the desired AWV (e.g., Rx AWV 48 shown in example in FIGS. 20A and 20B), which may have 128 TRN fields and 2 feedback frames (e.g., example shown in FIG. 12).

Figure 13:
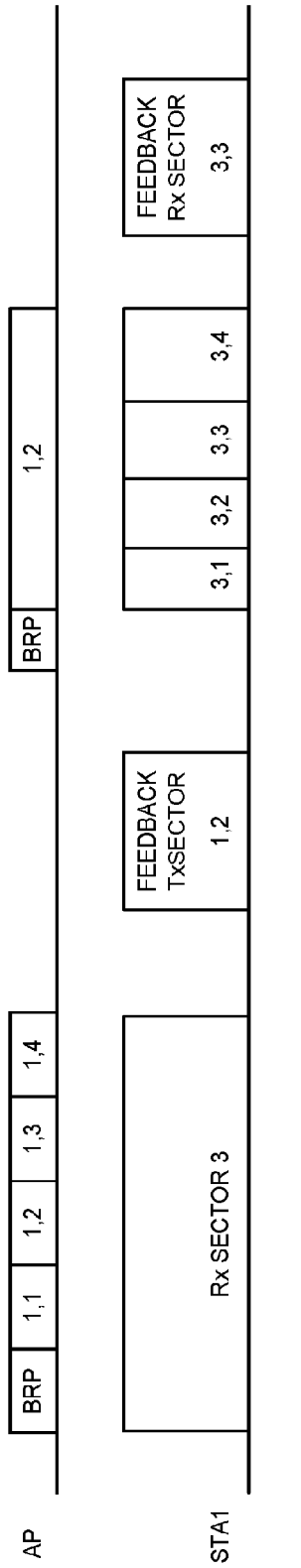
FIG. 13 is an example of MR-BRP Level 1.
Figure 17:
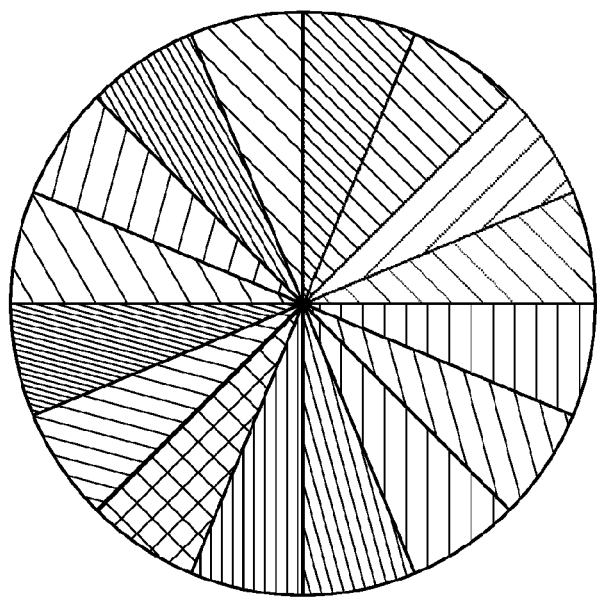
FIG. 17 is an example of BRP Level 1 with 4 antenna weight vectors (AWVs) per sector and an angular spread of 22.5 degrees.

FIG. 13 is an example of MR-BRP Level 1. FIG. 17 is an example of BRP Level 1 with 4 antenna weight vectors (AWVs) per sector and an angular spread of 22.5 degrees. The AP/PCP and STA may go through a first resolution BRP. The AP/PCP may send a BRP frame with 4 TRN-T frames (e.g., corresponding to sub-beams with a beamwidth of 22.5 degrees as shown in example in FIG. 17). The STA may set its receive sector to the sector identified in the SLS (e.g., sector 3). The STA may feedback a (e.g., best) Tx AWV for resolution level 1 (e.g., Tx sector 1, 2). The STA may request a receiver beam refinement. The AP/PCP may send a BRP frame with Tx sector as Tx sector 1, 2 and 4 TRN-R subfields. The STA may feedback a (e.g., best) Rx sector (e.g., Rx sector 3, 3). The second feedback may be optional, for example, when this is not the final MR level.

Figure 14:
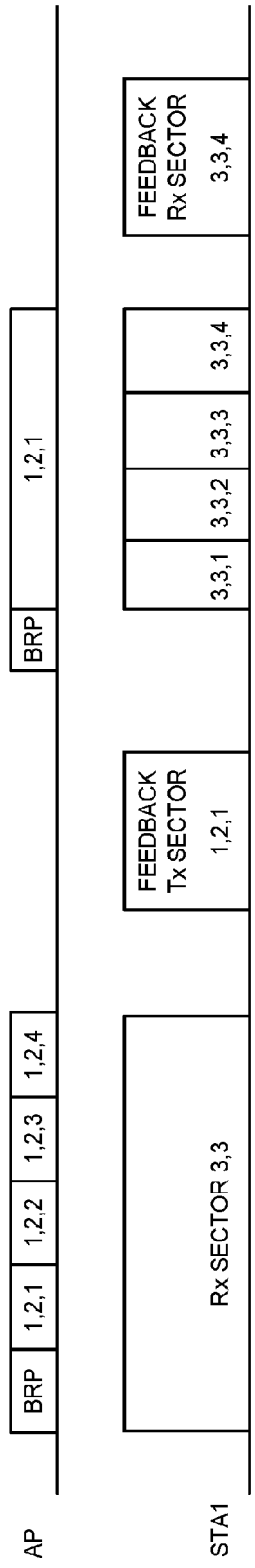
FIG. 14 is an example of MR-BRP Level 2.
Figure 18:
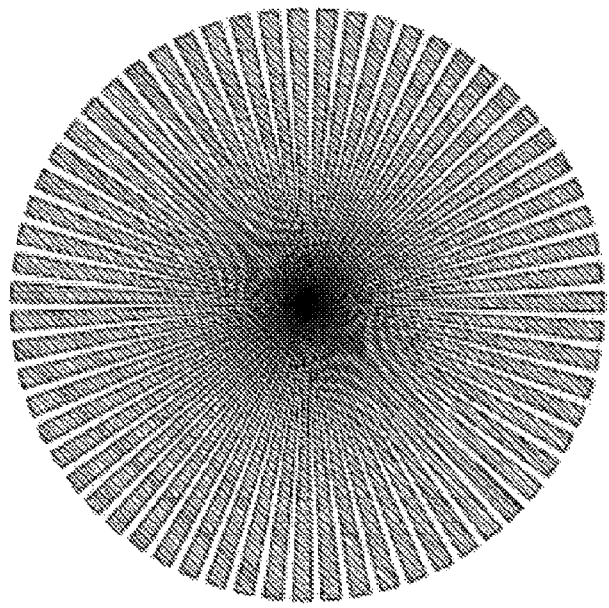
FIG. 18 is an example of BRP Level 2 with 4 AWVs per AWV in BRP Level 1, e.g., 16 AWVs per sector with angular spread 5.625 degrees.

FIG. 14 is an example of MR-BRP Level 2. FIG. 18 is an example of BRP Level 2 with 4 AWVs per AWV in BRP Level 1, e.g., 16 AWVs per sector with angular spread 5.625 degrees. The AP/PCP and STA may go through a second BRP resolution. The AP/PCP may send a BRP frame with 4 TRN-T frames (e.g., corresponding to sub-beams with beamwidth of 5.625 degrees as shown in the example in FIG. 18). The STA may set its receive sector to the sector identified in the first level BRP (e.g., sector 3, 3). The STA may feedback a (e.g. best) Tx AWV for resolution level 2

(e.g., Tx sector 1, 2, 1). The STA may request a receiver beam refinement. The AP/PCP may send a BRP frame with Tx sector as Tx sector 1, 2, 1 and 4 TRN-R subfields. The STA may feedback a (e.g., best) Rx sector (e.g., Rx sector 3, 3, 4). The second feedback may be optional, for example, when this is not the final MR level.

Figure 15:
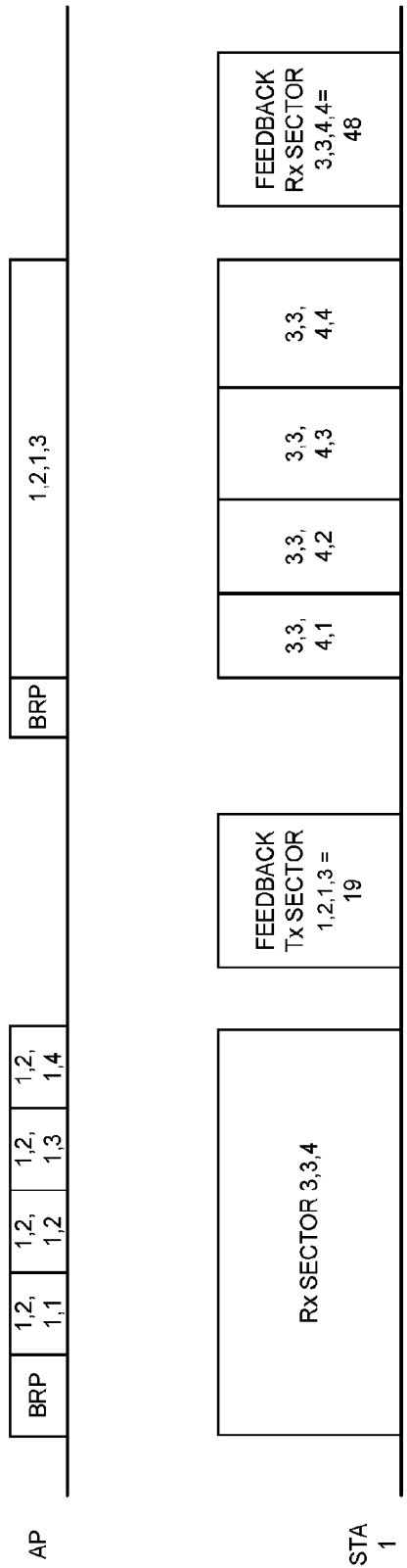
FIG. 15 is an example of MR-BRP Level 3.
Figure 19:
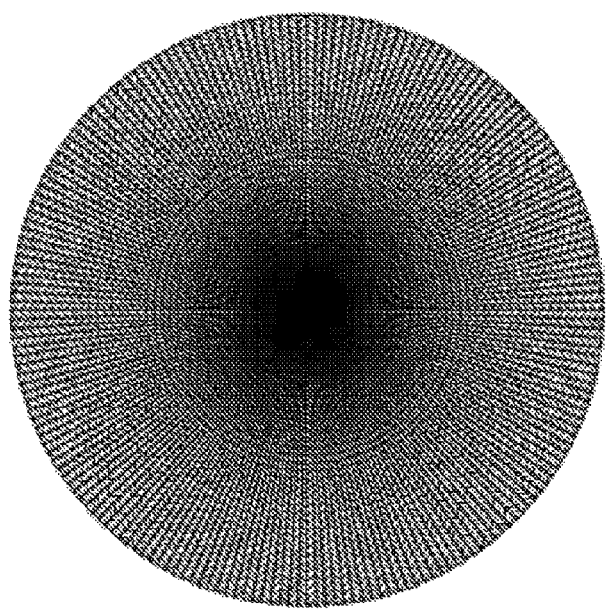
FIG. 19 is an example of BRP Level 3 with 4 AWVs per AWV in Level 2, e.g., 64 AWVs per sector with angular spread 1.046 degrees.

FIG. 15 is an example of MR-BRP Level 3. FIG. 19 is an example of BRP Level 3 with 4 AWVs per AWV in Level 2, e.g., 64 AWVs per sector with angular spread 1.046 degrees. The AP/PCP and STA may go through third BRP resolution. The AP/PCP may send a BRP frame with 4 TRN-T frames (e.g., corresponding to sub-beams with beamwidth of 1.06 degrees as shown in example in FIG. 19) with the STA setting its receive sector to the sector identified in the first level BRP (sector 3, 3, 4). The STA may feedback a (e.g., best) Tx AWS for resolution level 2 (e.g., Tx sector 1, 2, 1, 3=AWV 19). The STA may request a receiver beam refinement. The AP/PCP may send a BRP frame with Tx sector as Tx sector 1, 2, 1, 3 and 4 TRN-R subfields. The STA may feedback a (e.g., best) Rx sector (e.g., Rx sector 3, 3, 4, 4=AWV 48).

Comparing foregoing examples of MR-BRP and BRP, it may be observed that the MR-BRP example uses 24 TRN-R/T subfields to identify a (e.g., the best) Tx-Rx AWV while the BRP example may use up to 64 TRN-R/T subfields to reach the same resolution.

A training procedure may be sped up, e.g., in a scenario where there may be multiple STAs, for example, by making TRN-T sub-fields from a union of TRN-T fields fed back by the STAs.

The number of resolution levels in MR-BRP may be pre-negotiated, e.g., by the AP/PCP/STA pair, for example, before transmission, such as during a capability exchange or during a negotiation frame exchange. The AP/PCP or STA may (e.g. alternatively) terminate their own (or both) additional resolutions based on a metric (e.g. a change in SNR or capacity), for example, by not sending a BRP request.

Figure 21:
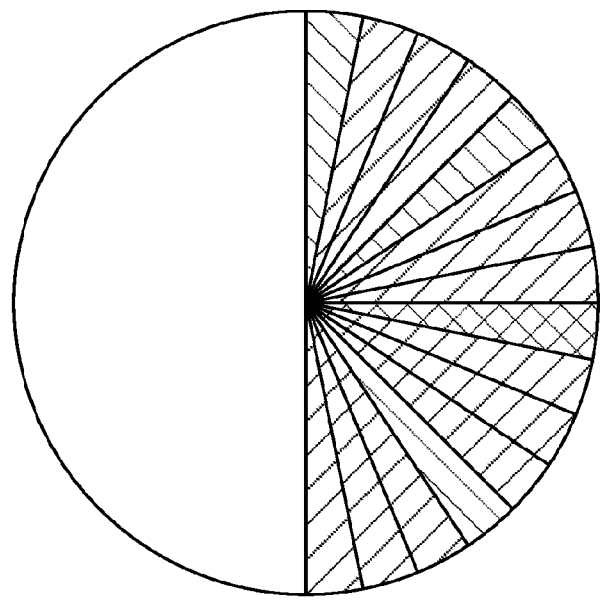
FIG. 21 is an example of AWV down selection level 1 with a down selection factor of 4 where the best direction is shown by the lightest gray sub-beam (AWV).

Sub-beams may be created, for example, by MR-BRP with down selection. In an example, an AP/PCP or STA may down-sample the sub-beams in the sector. The AP/PCP or STA may select down-sampled sub-beams with the best performance. Additional iterations may select sub-beams "close" to the selected sub-beam for further analysis. MR-BRP with down selection may be suitable, for example, for sub-beam creation examples herein. A multi-resolution BRP with down-selection may include one or more of the following, FIG. 21 is an example of AWV down selection level 1 with a down selection factor of 4 where the best direction is shown by the lightest gray sub-beam (AWV). In an example, it may be assumed that the SLS has identified the ideal transmit and receive sectors, e.g., as shown in the example in FIG. 21. For simplicity, the transmit sector is shown in FIG. 21. The AP/PCP may set its sub-beam down selection factor to 4 and may send a BRP with 4 TRN-T subfields to the receiver. The STA may feedback a (e.g., the best) beam (shown as the lightest gray in FIG. 21). The STA may request receiver beam refinement.

Figure 22:
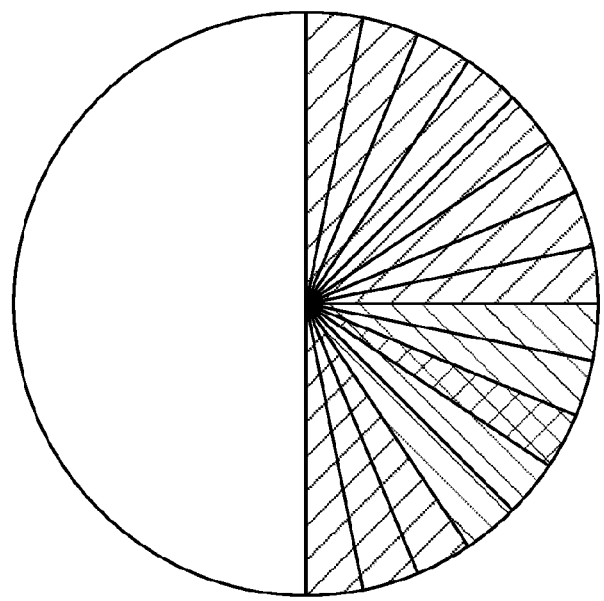
FIG. 22 is an example of AWV down selection level 2 where the STA sends AWVs "closest" to the level selected in level 1 and the lightest gray AWV is the best direction.

FIG. 22 is an example of AWV down selection level 2 where the STA sends AWVs "closest" to the level selected in level 1 and the lightest gray AWV is the best direction. The AP/PCP may send a BRP with a sub-beam down selection factor of 4, e.g., to identify the best sub-beam in the down-selection. The best down-selected sub-beam may be identified. The AP/PCP and STA perform a new BRP with sub-beam elements "closest" to the identified sub-beam, for example, as shown in FIG. 22.

Figure 23:
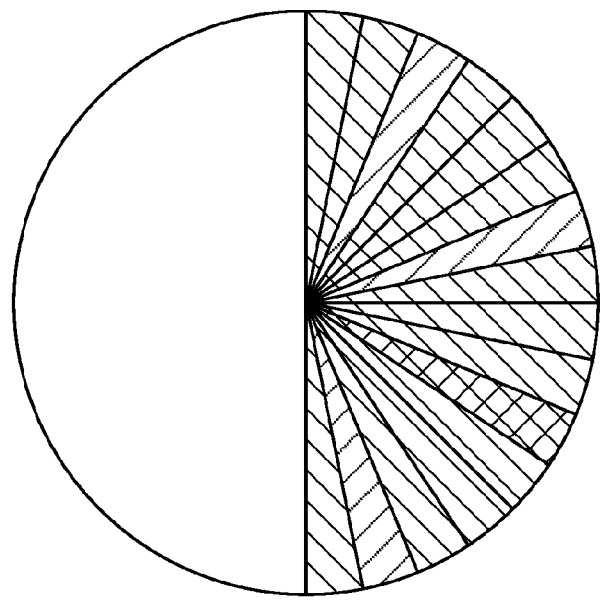
FIG. 23 is an example of AWV down selection level 1, iteration 2 with a down selection factor of 4.

FIG. 23 is an example of AWV down selection level 1, iteration 2 with a down selection factor of 4. A (e.g., an original or first level BRP) down-selection may not result in a satisfactory identified sub-beam, which may occur, for example, when beams are too narrow. A BRP may be repeated with a different sub-set (or down selection) of beams. For example, level 1 may be repeated (e.g., iteration 2) with a different sample set of AWVs when iteration 1 does not result in a satisfactory AWV. An increase in side lobes may reduce a probability of occurrence that down-selection may not result in a satisfactory identified sub-beam for sub-beam creation example 4, which down-samples the number of antenna elements excited in the physical antenna arrays (PAA).

Figure 24:
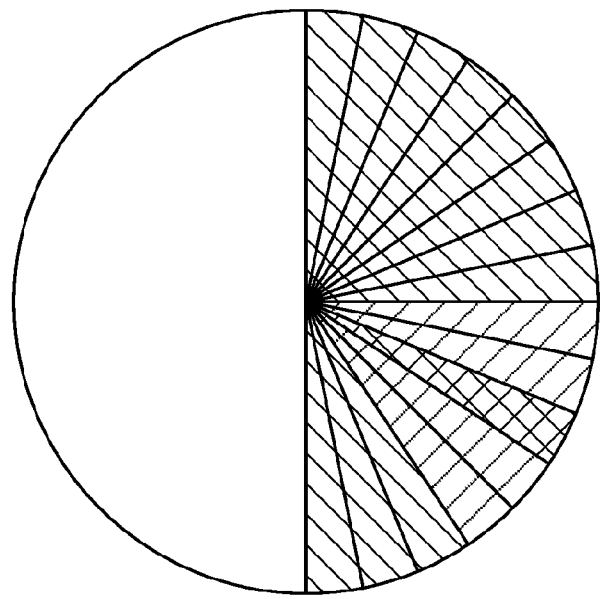
FIG. 24 is an example of AWV down selection level 2 where STA sends AWVs "closest" to the level selected in new level 1 and the lightest gray sub-beam (AWV) is the best direction.

FIG. 24 is an example of AWV down selection level 2 where STA sends AWVs "closest" to the level selected in new level 1 and the lightest gray sub-beam (AWV) is the best direction. On identification of the new best beam, an additional refinement may be done with the "closest" sub-beams.

MR-BRP may be used for multiple beams. MR-BRP may be updated when there are multiple beams. There may be N beams and within each resolution level there may be M sub-beams (AWVs). Two example implementations are provided. MR-BRP examples for multiple beams may be suitable, for example, for sub-beam creation examples herein.

In an example, sequential MR-BRP may be applied for multiple beams. MR-BRP may be performed and a first beam may be identified. This may be repeated until N beams are identified. Beams at each resolution level n identified from iterations 1 through N−1 may be removed from the BRP TRN-T/R subfields during training, for example, to ensure that the beams are independent.

Parallel MR-BRP may be applied for multiple beams. One or more of the following may be performed.

In an example, N*M beams may be identified for the transmitter (Tx) and receiver (Rx) at each resolution level. At each level, N*M AWV beams may be evaluated and N beams may be selected. In the example of parallel MR-BRP for transmit training (TRN-T), N=2 and M=2. In other examples, N and M may have different values.

Figure 25:
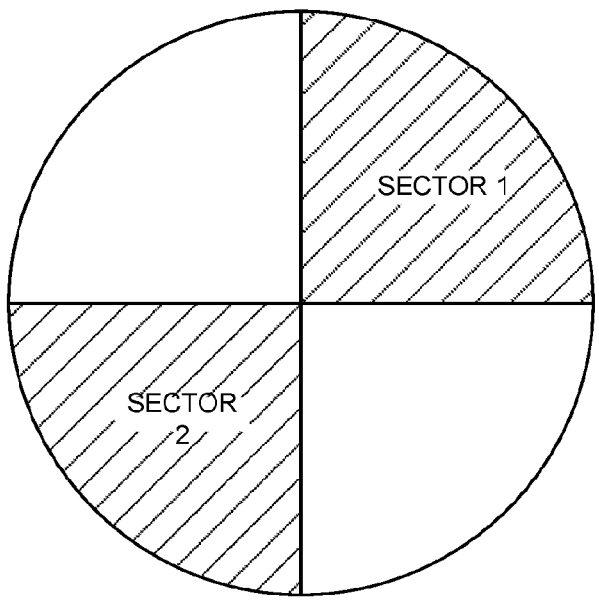
FIG. 25 is an example of SLS selecting 2 sectors.

FIG. 25 is an example of SLS selecting 2 sectors. During SLS, N (e.g., 2) sectors may be selected for evaluation, e.g., as shown in FIG. 25.

Figure 26:
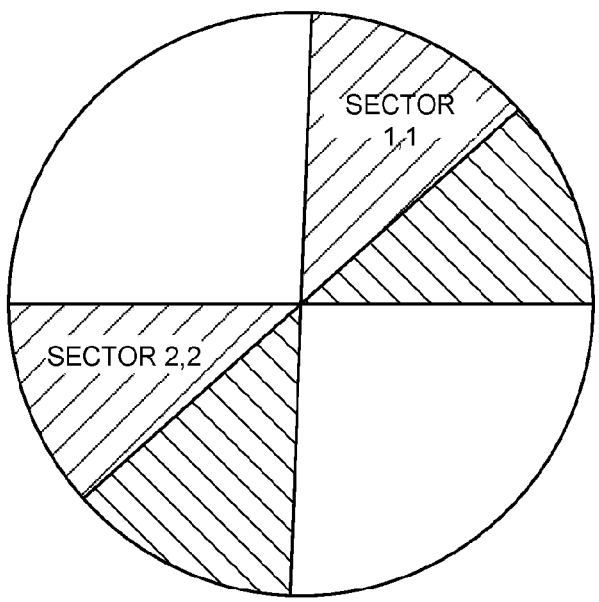
FIG. 26 is an example of MR-BRP Level 1 evaluating 4 beams and selecting 2 beams.
Figure 27:
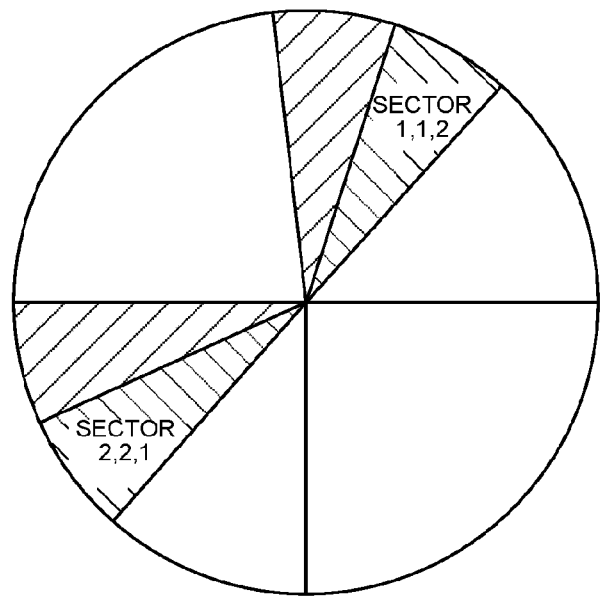
FIG. 27 is an example of MR-BRP Level 2 measuring 4 beams and selecting 2 beams.
Figure 28:
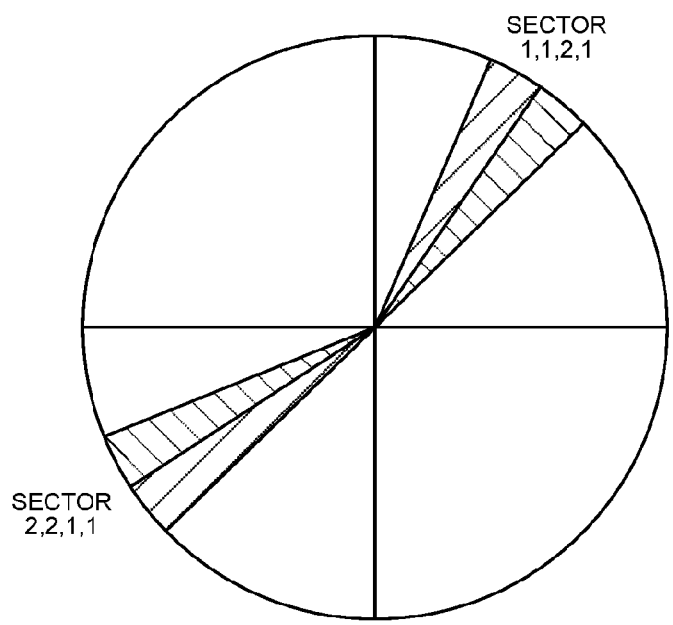
FIG. 28 is an example of MR-BRP Level 3 measuring 4 beams and selecting 2 beams.

FIG. 26 is an example of MR-BRP Level 1 evaluating 4 beams and selecting 2 beams. FIG. 27 is an example of MR-BRP Level 2 measuring 4 beams and selecting 2 beams. FIG. 28 is an example of MR-BRP Level 3 measuring 4 beams and selecting 2 beams. In an example, for each level and within each sector the transmitter (Tx) and receiver (Rx) may evaluate M sub-beams, which may result in N*M (e.g., 4) sub-beams being evaluated and N sub-beams being selected. Selected beams are shown in in light gray in FIGS. 26-28.

MR-BRP may be used for beam tracking. Each device may be asked to save the best beam for each resolution. A PCP/AP or STA may initiate a request to revert back to a specific higher resolution, e.g., for repeated beam tracking. An example of beam tracking using MR-BRP may be provided. One or more of the following may apply.

For beam tracking using MR-BRP, a PCP/AP and STA may, for example, go through a three level MR-BRP. At each level, the PCP/AP and STA may store the index of the best sub-beam. A PCP/AP and STA may negotiate a beam tracking threshold. In an example, a beam tracking threshold may be based on x number of beam-tracking requests in y seconds. An MR-fallback initiator may send an MR-fallback request to an MR-fallback-responder. A fallback may be to a specific level or a certain number of levels (e.g., fallback one level). A fall back may, for example, be required by both initiator and responder or may be a (e.g., two-step) process in which they take turns (e.g., first the responder then the initiator). A stepped process may occur, for example, to determine whether there is a need for both initiator and responder to fall back. A fall back may, for example, require the device with the narrower beam to fall back. A responder may implement a fall back and send an ACK to an initiator, for example, when the responder is required to fall back. A responder may send an ACK and then fall back for the next transmission, for example, when an initiator is required to fall back.

MR-BRP capability may be signaled. An AP/PCP and STA(s) may provide an indication (e.g., by sending a capability request or advertising) that they are capable of MR-BRP, e.g., to ensure the STA may operate properly in the network. An indication may be provided, for example, by modification of a capabilities information element.

A directional multi-gigabit (DMG) capability element may be used, for example, to indicate the ability to perform MR-BRP. The DMG capabilities element may be sent out by an AP/PCP or STA to advertise the capabilities of the device to the basic service set (BSS) and may be sent, for example, in the association request, association response, re-association request, re-association response, probe request, probe response or information request/response frames. MR-BRP capability may also be present in the DMG beacon. The element may contain the DMG STA capability information field and DMG PCP/AP capability information field. These fields may include a sub-field that may indicate whether AP/PCP or STA supports MR-BRP. A parameter may be placed in the element, for example, to indicate the maximum number of resolutions.

BRP frame format may be specified for MR-BRP. Table 1 shows an example BRP frame format with fields for MR-BRP, such as BRP request field and DMG beam refinement field.

TABLE 1

| Order | Information |
| --- | --- |
| 1 | Category |
| 2 | Unprotected DMG Action |
| 3 | Dialog Token |
| 4 | BRP Request Field |
| 5 | DMG Beam Refinement Element |
| 6 | Channel Measurement Feedback Element 1 (Optional) |
| ... | ... |
| 6 + N + 1 | Channel Measurement Feedback Element N (Optional) |

A BRP frame format may be transmitted in a PLCP Protocol Data Unit (PPDU) frame, for example, as shown in FIG. 6.

A BRP Request Field may be updated, for example, to identify resolution levels. A field may be provided, for example, to indicate which one or more types of MR-BRP procedures are supported or used, e.g., when different multi-resolution BRP procedures are supported or used.

Subfields may be provided, for example, for MR-BRP with different sub-beam resolutions. In an example, the following sub-fields may be added: (i) maximum resolution level, which may indicate a maximum number of resolution levels to be used by a device and/or (ii) current resolution level, which may indicate a resolution level used by the current BRP transmission.

Subfields may be provided, for example, for MR-BRP with down-selection. In an example, the following sub-fields may be added: (i) total number of subsets and/or (ii) subset index.

Signaling may not be needed for TRN-T, e.g., because it is transparent to the receiver.

Subfields may be provided, for example, for MR-fallback. In an example, the following sub-fields may be added: (i) BRP Fall back Request and/or (ii) BRP Fall back resolution level.

A BS-FBCK sub-field of a DMG Beam Refinement Element may, for example, include a field that indicates no further improvement is possible based on multi-resolution. This indication may be provided, for example, when the maximum resolution is reached or there is no change in an implementation dependent metric with further beam resolution. This indication may prevent unnecessary beam refinement by the transmitter/receiver.

A resolution level may (e.g., also) be chosen based on the variability of a channel. Narrow beams may result in the need for repeated beam tracking (e.g., for channels with substantial variation). Requesting a beam with lower resolution may reduce the need for repeated beam tracking.

Resolution levels may be used. The resolution levels may be assigned statically or dynamically.

A static resolution level assignment may be used. Resolution levels and/or their associated AWV/sectors may be pre-defined. The number of resolution levels allowed may be pre-defined. Implementation specific sectors/AWVs may be assigned to a resolution level.

A dynamic resolution level assignment may be used. For example, resolution levels may be set up as a group (e.g., with the sectors, e.g., all the sectors, within a BRP iteration). Sectors or AWVs may be dynamically grouped together to form a resolution. The grouping may be done by labeling the sectors (e.g., all the sectors) within a BRP iteration as a resolution level. This implicitly assigns a resolution level to the AWVs/Sectors (e.g., all the AWVs/Sectors) used within the BRP iteration. The same ID may be associated with the group of sectors.

For dynamic resolution, explicit labeling/assignment of sectors to a group may be used. Labeling may be done (e.g., explicitly) with a group ID associated with a group of sectors/AWVs (e.g., by a specific request/response message exchange). A STA may request a resolution(s), and the responding STA may respond with the resolution group ID and/or the associated sectors. A STA may request a resolution(s) with a group ID, and the responding STA may responds with the associated sectors.

For dynamic resolution, the STA may piggy-back the group ID during the SLS or BRP feedback. A group ID may be added (e.g., in the DMG Beam Refinement element to associate a single groupID with a BRP feedback frame). The Group ID may be placed in the FBCK-TYPE field or as a separate field FBCK-Group field. The Group ID may be added as a single value in the Channel Measurement Feedback element.

For dynamic resolution, a group ID may be added for each antenna sector that is fed back in the Channel Measurement Feedback element. For example, the Sector ID Order subfield may become SectorID_n, Antenna ID_n, Group_n.

Sector grouping may be used to define (e.g., implicitly) a resolution to help the initiator or responder identify a group of sectors for use in the beam combining sub-phase of BRP, define a subset of beams during the BRP procedure for refinement of two or more beam pairs (e.g., simultaneously), and/or assist in efficient signaling for a BRP transaction.

The group size (e.g., the number of beams in each group) may be the same or different. In one example, a single resolution group of 256 beams may be resolved into four groups of 4 beams each (4, 4, 4, 4) or three groups with combinations (4, 4, 16), (16, 4, 4) or (4, 16, 4).

For assisting in signaling for a BRP transaction, the transmitting device may transmit a refinement transaction (e.g., using the TRN-T), may have determined/know the set of transmit antennas to use, and may determine/want to identify a specific set of Rx antennas to sweep (e.g., current BRP fixes the antenna to the best antenna). The receiving device may request a set of transmit antennas. In a receive refinement transaction, the receiving device may indicate the number of receive antennas available (e.g., by setting the L-RX) and may determine/want the transmitter to use a specific transmit set. The transmitting device may request that the receiving device use a set of receive antennas.

BRP may determine to fallback to a specific sector (e.g., of size SLS) based on a unique antenna ID. Multi-Resolution/Sector Grouping may have fallback to a unique sector or group of sectors. Multi-Resolution/Sector Grouping may improve the fallback sweep efficiency.

BRP may have a transmitting device that may stop by setting the MID field to 0. Multi-Resolution/Sector Grouping may have a transmitting device stop by setting the MID field to 0 and, with grouping and associated signaling, a receiving device may input to the set of sectors to use (e.g., use efficiently).

Multi-Resolution Sector Level Sweep (MR-SLS) may be used and may reduce the amount of training during the beamforming refinement procedure, reduce latency, and increase BF training efficiency.

Multi-resolution beam refinement may be achieved by multi-resolution sector level sweep. Using multi-resolution beam refinement, a multi-stage sector level sweep may be defined.

Figure 29:
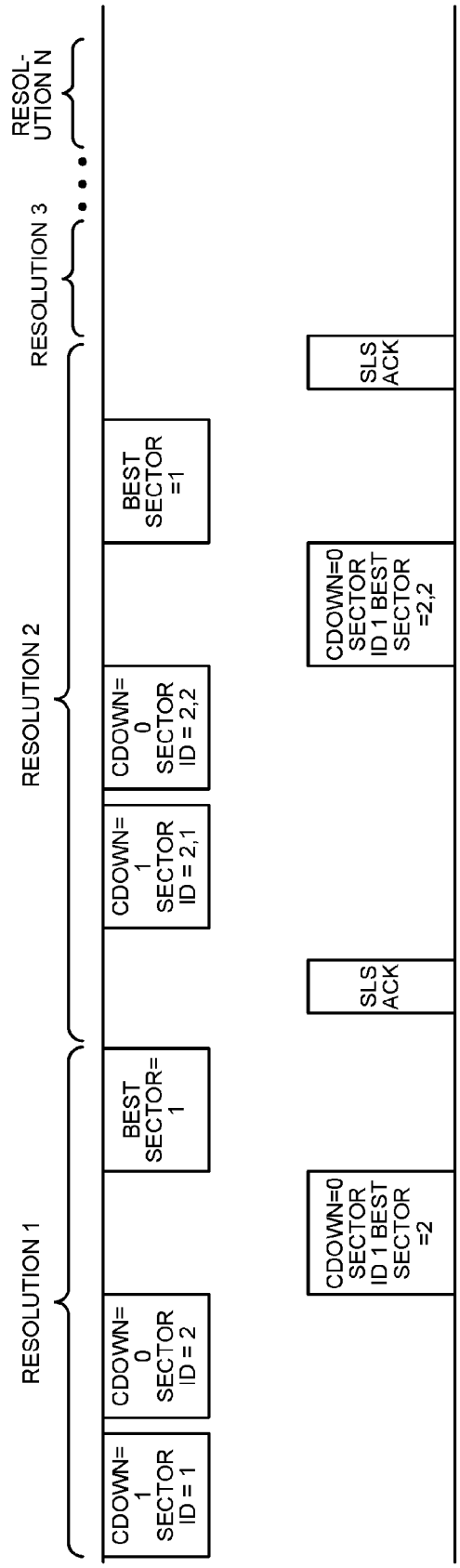
FIG. 29 is an example of a Multi-Resolution Initiator that is backwards compatible.

An example of multi-resolution initiator TX Sector Sweep (TXSS) is shown in FIG. 29. Multi-resolution initiator TXSS may be backwards compatible. A multi-resolution TXSS may have/use one or more of the following.

For multi-resolution TXSS, an initiator may start its initiator TXSS in an SP (e.g., when an initiator TXSS is indicated for that SP by, e.g., the extended schedule element or grant frame). The extended schedule element or grant frame may be extended (e.g., with the current resolution level for initiator TXSS). The resolution level may be derived from quasi-omni beam width. For example, "0" may imply the resolution of the Quasi-omni beam width; "1" may mean ½ or ¼ or other fractions of the quasi-omni beam width; "2" may mean ¼ or ⅛ or further fractions of the beamwidth from level "1." The initiator may adapt the resolution level indicated for its initiator TXSS. An initiator may have memory of the current resolution level of the initiator TXSS with a particular STA.

For multi-resolution TXSS, the initiator may use beacon, SSW frames, and/or EDMG (e.g., short) SSW frames (e.g., short) to conduct each round of initiator TXSS for a particular resolution level. The CDown field may indicate the number of frames that may be sent before the initiator TXSS for the current resolution level is completed. The training frames that the initiator sent may contain the current Sector ID. The training frames may also contain the current resolution level. The last training frame, which includes CDOWN=0, may indicate one or more sequences of SLS (e.g., additional sequences of SLS), or initiator TXSS. The TXSS may have improved resolution levels.

A responder may transmit (e.g., when the responder receives a training frame containing a CDown value=0) a SSW frame (e.g., short SSW frame) containing CDOWN value=0, its current sector ID, and/or the Best Sector ID that it has detected for the initiator. The last training frame, which may include CDOWN=0, may indicate one or more sequences of SLS (e.g., additional sequences of SLS), or initiator TXSS (or responder RXSS). The TXSS (or responder RXSS) may have improved resolution levels.

The initiator may send a (e.g., short) SSW Feedback frame (e.g., upon receiving the training frame containing a CDOWN value=0 from the responder), which may contain the sector (e.g., best sector) that the initiator has detected for the responder. The (e.g., short SSW) SSW Feedback may also contain indications for one or more sequences of SLS (e.g., additional sequences of SLS), or initiator TXSS (or responder RXSS). The TXSS (or responder RXSS) may have improved resolution levels. An SSW (e.g., Short SSW) feedback frame may be skipped (e.g., if backwards compatibility is not an issue, e.g., when both initiator and responder STAs are EDMG STAs). Skipping an SSW (e.g., Short SSW) feedback frame may yield higher efficiency.

The responder may send a (e.g., short) SS ACK frame (e.g., upon receiving the (e.g., short) SSW Feedback frame), which may contain indications for one or more sequences of SLS (e.g., additional sequences of SLS) or initiator TXSS (or responder RXSS). The TXSS (or responder RXSS) may have improved resolution levels. An SS ACK (e.g., short) frame may be skipped (e.g., if backwards compatibility is not an issue, e.g., when both initiator and responder STAs are EDMG STAs). Skipping an SS ACK (e.g., short) frame may yield higher efficiency.

The initiator may start with a round (e.g., another round) of initiator TXSS, either in a new SP, or in the same SP (e.g., which may follow, e.g., directly, the previous initiator TXSS of lower resolution levels).

The initiator may indicate sector IDs (e.g., using complete new numbers, such as 1, 2, 3, etc.), which may make the multi-resolution TXSS transparent for the responder. The training frames (such as (short) SSW frames or beacon frames) used by the initiator may carry signaling indicator current resolution levels and/or different or the same encoding for different sector IDs. The initiator may remember the true sector IDs to be used in future exchanges with the responder by saving them in memory (e.g., when different sector encoding is used).

The responder may provide feedback for the best sectors that it determined for the initiator, and send it to the initiators.

An exchange of (e.g., short) SSW Feedback and/or SS ACK frames may follow for the second resolution level.

The initiator and/or responder may indicate whether they desire additional initiator TXSS and/or responder RXSS in any frames, including any of the (e.g., short) SSW frames, beacon frames, (e.g., short) SSW Feedback frames and/or (e.g., short) SSW frames, Extended Schedule element, Grant frames, etc. As for resolution 1, (e.g., short) SSW Feedback and SS ACK frames may be eliminated from the SLS (e.g., in case backwards compatibility is not an issue, e.g., when both initiator and responder are EDMA STAs).

The multi-resolution SLS procedure may complete after N rounds of initiator TXSS and/or Responder RXSS (e.g., with improved resolution levels).

The initiator TXSS and/or responder RXSS techniques may be expanded to other scenarios.

Figure 30:
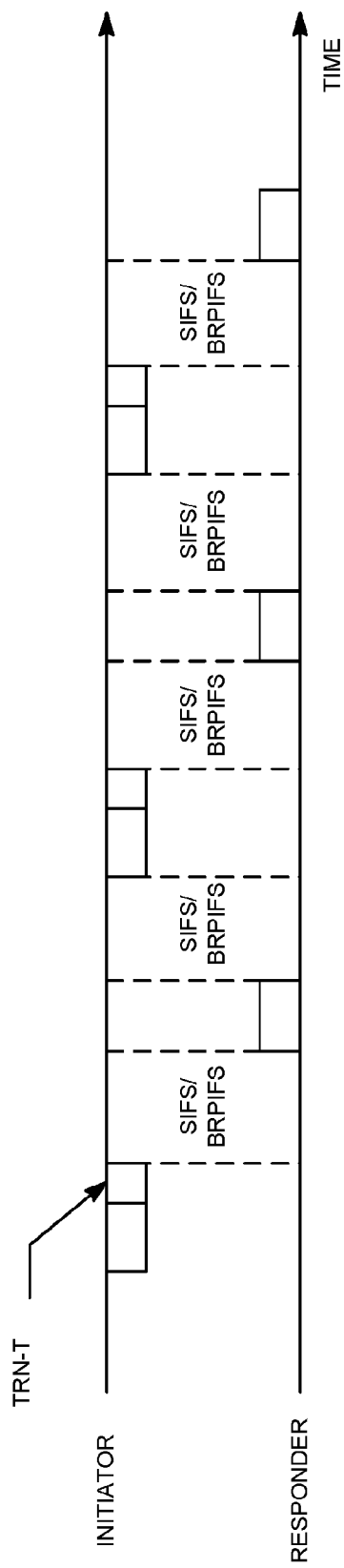
FIG. 30 is an example of multiple BRP frames for Multi-Resolution beamforming training.

Multi-resolution BRP may be used. Multi-resolution beamforming training shown in FIG. 30 may use multiple BPR frame exchanges, which may be different from single-resolution beamforming training, where only one feedback may be used for one round of training. BRP may be robust to interruption and/or backward tractable.

Multi-resolution BRP may be used at AP (TX). For TRN-T of BRP transaction in each level shown in FIG. 13, a TRN-unit with a TRN subfield (e.g., four TRN subfields) may be assigned with a TX AWV configuration (e.g., one TX AWV configuration). A TRN-unit may correspond to one training sector. For TRN-T of BRP transaction in each level shown in FIG. 13, a TRN subfield may be associated with a TX AWV (e.g., one TX AWV). A TRN-unit may support four training sectors. A TRN subfield associated with a TX AWV (e.g., one TX AWV) may have shorter TRN-T training packets (e.g., as compared to a TRN-unit with a TRN subfield (e.g., four TRN subfields) that may be assigned with a TX AWV configuration (e.g., one TX AWV configuration). A TRN subfield associated with a TX AWV (e.g., one TX AWV) may have lower accuracy (e.g., due to a shorter training time for each sector and/or multiple signal transitions among subfields), e.g. as compared to a TRN-unit with a TRN subfield (e.g., four TRN subfields).

The sector IDs may be ordered (e.g., to enable multi-resolution BRP) in each level and may not be unique among different levels. Channel measurement feedback may not be included (e.g., where only a sector ID is needed), in the RX packets (e.g., so as to reduce the length of feedback packets). The ordered sector ID (e.g., the best ordered sector ID) is fed back in the DMG beam refinement element for example as shown in FIG. 12. The TX (e.g., only the TX) may have knowledge of the sector information. The TX can track backward to the previous feedback (e.g., when interruption of feedback happens) from the RX and use the corresponding sector for transmission.

For BRP IFS, in 802.11ad, the interframe spacing between a BRP frame and its response is at least SIFS and at most BRPIFS. SIFS may be 3 µs and BRPIFS may be 44p. BRPIFS may be used by STAs between any combination of transmissions of BRP-TX and BRP-RX packets. Since multi-resolution BRP has several frame exchanges, IFS may have an influence on the TXOP.

Figure 31:
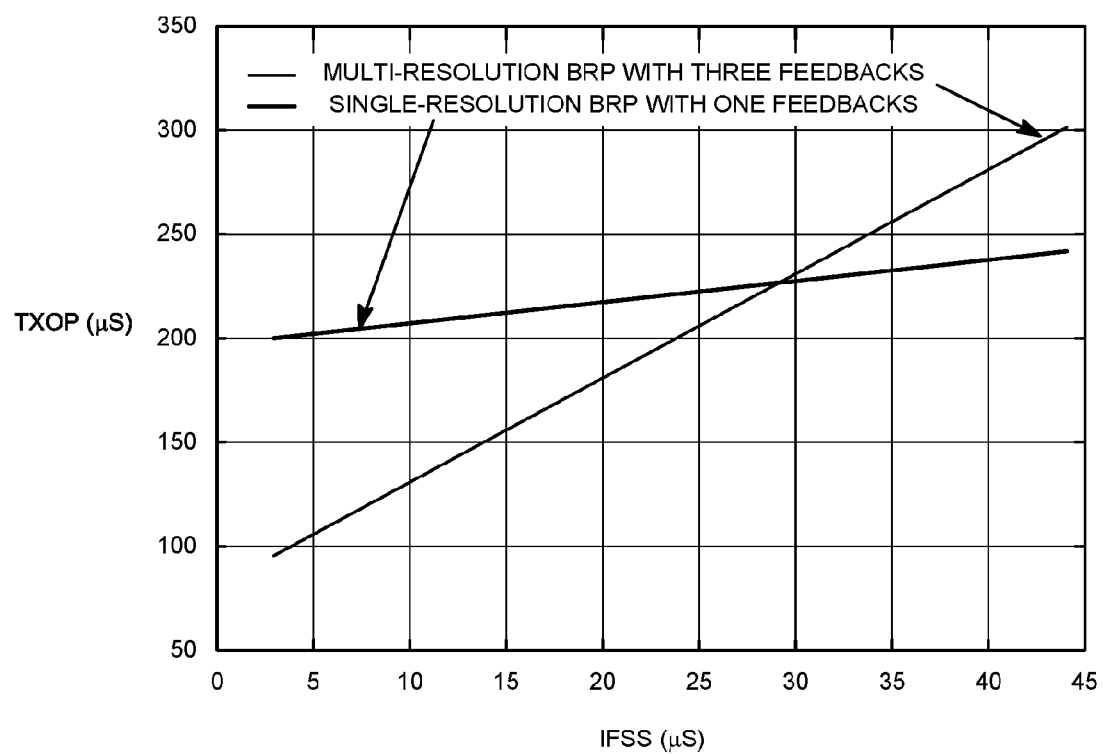
FIG. 31 is an example of TXOP as a function of a uniform IFS.

For an example of a three-level multi-resolution beamforming training, the TXOP may be a function of a uniform IFS, e.g., as shown in FIG. 31, (e.g., where single-resolution beamforming training is considered for comparison). The TXOP of the multi-resolution beamforming may be shorter than that of single-resolution beamforming (e.g., if IFS is small enough (e.g., FIG. 31)). When BRPIFS is used, the TXOP of multi-resolution BRP may be longer. The IFS may be optimized in BRP design.

With BRP-TX, the BRPIFS may be used between the TRN-T and the feedback and this may provide reliable transmission. TRN-R may not be used for the feedback packet. The IFS between the feedback and the next BRP-TX packet may be modified. The TXOP as a function of the IFS between the feedback and the next BRP-TX packet is plotted in FIG. 32, where the IFS between the TRN-T and the feedback is set as BRPIFS.

Figure 32:
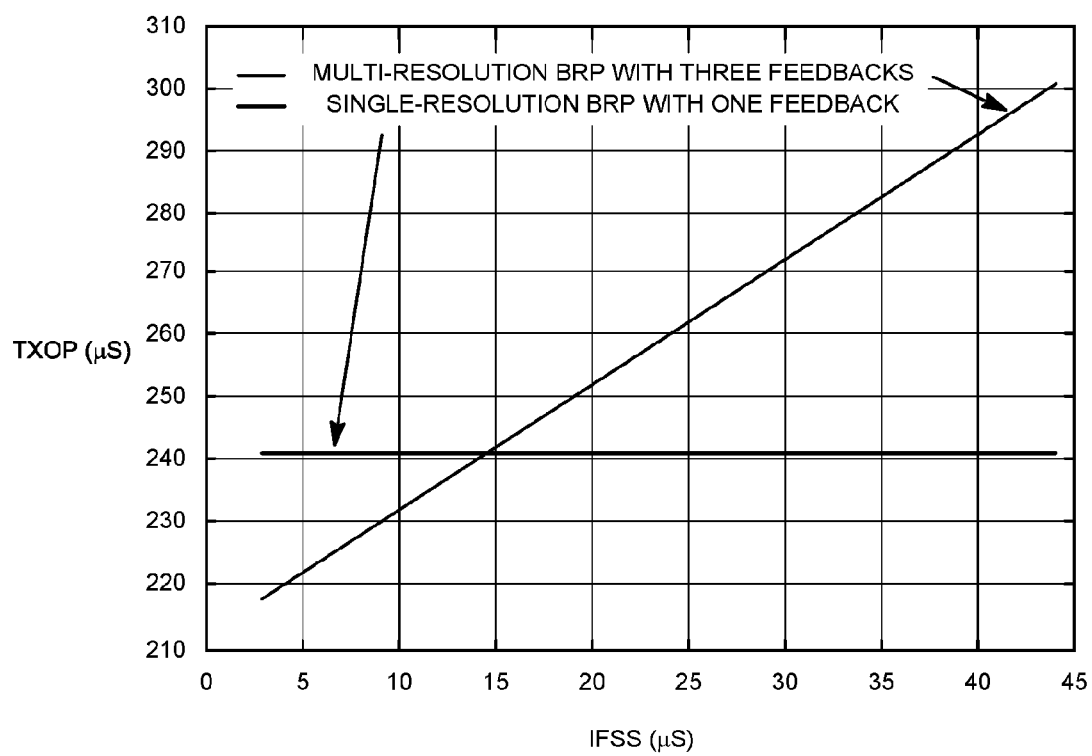
FIG. 32 is an example of TXOP as a function of IFS between the feedback and the next BRP-TX packet.

Referring to FIG. 32, if the IFS between the feedback and the next BRP-TX packet is set as less than 5*SIFS, the multi-resolution BRP may have better TXOP than the single-resolution BRP.

Multi-resolution BRP for multi-beam or multi-channel may be used. The multi-resolution BRP for multi-beam or multi-channel may have independent or shared signaling.

For independent multi-resolution BRP signaling, the multi-resolution BRP may be implemented independently for multi-beam with time division or multi-channel with frequency division. A beam pair (e.g., the best beam pair) may be searched independently for different beams or different channels. Independent BRP packets can be used for different beams or different channels, which may have the legacy signaling as in FIG. 14.

Figures 33, 34:
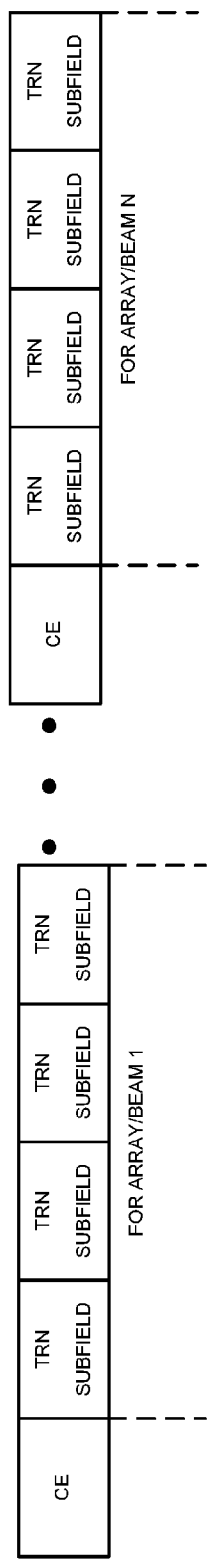
FIG. 33 is an example of the TRN field with training capability for different array/beams.
FIG. 34 is an example of an eDMG beam refinement element.

For shared multi-resolution BRP signaling, the multi-resolution BRP may use shared signaling for multi-beam training (e.g., simultaneously). The candidate beam pairs (e.g., all the candidate beam pairs) of different antenna arrays, e.g., different beams, have a unique ordered sector ID in each level. The training may be carried out for different arrays with different antenna ID within one BRP-TX packets. The TRN field will be extended with training capability for different arrays/beams, which can be as shown in FIG. 33. The RX may have several BS-FBCK bits that indicate the sector IDs (e.g., best sector IDs) for different arrays/beams. The eDMG beam refinement element can be modified as shown in FIG. 34.

Multi-resolution BRP for multiuser may be used. The multi-resolution BRP can enable beamforming training for multiple users. Independent or shared BRP can be used.

For independent multi-resolution BRP, the multi-resolution BRP may be implemented independently for different users using multi-beam with time division or frequency division. The BRP signaling may be independent for different users, which may have the legacy structure as in FIG. 14.

Figure 35:
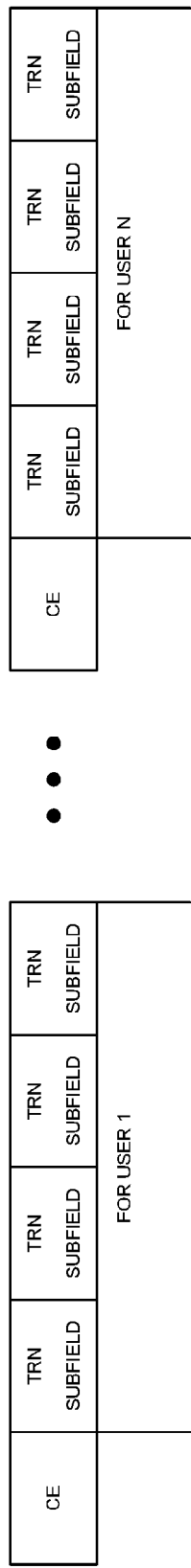
FIG. 35 is an example of a TRN field extended for multiusers.

For shared multi-resolution BRP, multiple users may use the shared multi-resolution BRP for beamforming training. Users may have the same sectors according to the SLS. The multiuser multi-resolution BRP can be based on the broadcasted signals from the TX. The TRN field may be extended for multiusers, as shown in FIG. 35.

Figure 36:
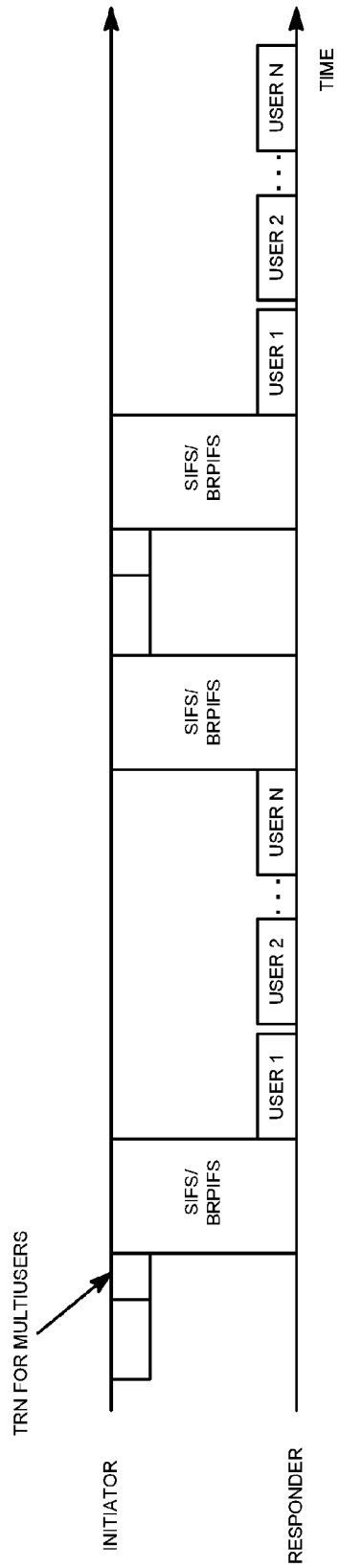
FIG. 36 is an example of multiuser multi-resolution BRP.

Different users may feedback the individual sector ID (e.g., best individual sector ID) through for example time division. Multiuser multi-resolution BRP is shown in FIG. 36.

The number of training beams (e.g., overall number of beams) transmitted for a narrow beam system may be reduced, (e.g., in MIMO where multiple transmit-receive pairs may be used). A connection between the transmitter-receiver pair may be made at any stage (e.g., without the need for waiting, e.g., a long wait). Beam down-selection can also be used and beam down-selection may reduce the training overhead.

The initiator or responder can request training (e.g., at a particular resolution level) and trade-off (e.g., dynamically) BFT efficiency and/or beam accuracy.

A node can request for BFT with a resolution fallback in case of a change in the channel. This may be advantageous for beam tracking. This may be used for the interruption of the BRP procedure (e.g., at anytime, flexible in case of BI boundary, allocation boundary . . . ).

The existing BRP procedure may not be very efficient for multi-resolution BRP (e.g., not due to the minimum MAC block sizes and the interframe spacing). This may be improved by allowing for a smaller IFS, additional signaling to enable beam grouping, and/or a BRP frame design (e.g., short BRP frame design).

While examples are directed to 802.11 protocols, subject matter herein is applicable to other wireless communications and systems. Each feature, element, action, or other aspect of the described subject matter, whether presented in figures or description, may be implemented alone or in any combination, including with other subject matter, whether known or unknown, regardless of examples presented herein.

In one example, a 3GPP Radio system may use the methods proposed here including where the AP is the Transmit/Receive Point (TRP), the STA is the User Equipment (UE or WTRU), the sectors or AWVs become TRP beams, and/or the signaling may be sent either by PHY layer control signaling or Layer 2 signaling.

Systems, methods, and instrumentalities have been disclosed for multi-resolution training, for example, in millimeter wave (mmW) WLAN systems. In a Multi-Resolution Beam Refinement Protocol (MR-BRP), an access point (AP)/PBSS control point (PCP) and a station (STA) may perform multi-resolution beamforming training, for example, by changing a sub-beam resolution or by maintaining sub-beam resolution while changing a resolution of the beamforming training between levels or stages of training. Sub-beam resolution may be changed, for example, by assigning different angular spreads to or by downselecting a number of antenna elements while keeping inter-element spacing constant between levels of training. Resolution of beamforming training may be changed, for example, by downsampling sub-beams or by downsampling antenna elements while adjusting inter-element spacing. Beamforming training (e.g., refinement) levels may refine beams by changing a resolution of antenna weight vectors (AWVs). An AP/PCP and STA may search through a sector multiple times with sub-beams of different resolution to identify a correct pair of sub-beams at a desired resolution. MR-BRP may be used for single or multiple beams, for example, to generate M sub-beams (AWVs) for N beams sequentially or in parallel. MR-BRP may be used for beam tracking. Devices may save the best sub-beam at each level of MR-BRP and may revert (fall back) to a sub-beam at previous level. MR-BRP signaling may indicate MR-BRP capability, type, frame format, etc.

Each of the computing systems described herein may have one or more computer processors having memory that are configured with executable instructions or hardware for accomplishing the functions described herein including determining the parameters described herein and sending and receiving messages between entities (e.g., WTRU and access point or network) to accomplish the described functions. The processes described above may be implemented in a computer program, software, and/or firmware incorporated in a computer-readable medium for execution by a computer and/or processor. It is understood that each of the computing systems has a computer program, software, and/or firmware incorporated in a computer-readable medium for execution by a computer and/or processor for determining and deciding each of the described algorithmic function, and algorithms include determining, saving a determined parameter to memory, retrieving parameters from memory where used, sending and receiving information.

Although features and elements may be described above in particular combinations or orders, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method of multiresolution beam refinement for multiple beams transmitted between a wireless access point and a plurality of wireless stations that communicate in a wireless local area network (WLAN), comprising:
    performing, in the wireless access point, a wireless access point initiator transmitter sector sweep and a receiver sector sweep between the wireless access point and at least one of the plurality of wireless stations using the WLAN that comprises the wireless access point sending a beam refinement protocol frame comprising a beam refinement protocol (BRP) request field;
    determining beam sectors for a first resolution having a first number of iterations between the access point transmitter and at least one of the plurality of wireless stations receiver;
    determining beams within the determined beam sectors for the first resolution based on an antenna weight vector (AWV) for each beam within the determined beam sectors for the first resolution;
    determining a first resolution best beam for each determined sector for the first resolution;
    determining beam sectors for a second resolution having a second number of iterations between the access point transmitter and at least one of the plurality of wireless stations receiver;
    determining beams within the determined beam sectors for the second resolution based on an AWV for each beam within the determined beam sectors for the second resolution;
    determining a second resolution best beam for each determined sector for the second resolution; and
    determining a best beam by comparing the first resolution best beam with the second resolution best beam.

2. The method of claim 1, further comprising sending a transmit beam refinement protocol frame with transmit refinement transaction (TRN-T) subfields, from the wireless access point, to the at least one of the plurality of wireless stations.

3. The method of claim 2, further comprising receiving a best antenna weight vector (AWV), at the wireless access point, from the at least one of the plurality of wireless stations.

4. The method of claim 3, receiving a best sector, at the wireless access point, from the at least one of the plurality of wireless stations that was determined from the transmitter and receiver sector sweeps.

5. The method of claim 1, wherein the AWV for each beam sector is predefined.

6. The method of claim 1, wherein the first and the second resolutions are performed for time division multiplexing and frequency division multiplexing communications between the access point and the at least one of the plurality of wireless stations.

7. A wireless access point for communicating with a plurality of wireless stations using a multiresolution beam refinement for multiple beams transmitted between a wireless access point and a plurality of wireless stations that communicate in a wireless local area network (WLAN), comprising:

a processor configured to perform, in the wireless access point, a wireless access point initiator transmitter sector sweep and a receiver sector sweep between the wireless access point and at least one of the plurality of wireless stations using the WLAN that comprises the wireless access point sending a beam refinement protocol frame comprising a beam refinement protocol (BRP) request field;

determine beam sectors for a first resolution having a first number of iterations between the access point transmitter and at least one of the plurality of wireless stations receiver;

determine beams within the determined beam sectors for the first resolution based on an antenna weight vector (AWV) for each beam within the determined beam sectors for the first resolution;

determine a first resolution best beam for each determined sector for the first resolution;

determine beam sectors for a second resolution having a second number of iterations between the access point transmitter and at least one of the plurality of wireless stations receiver;

determine beams within the determined beam sectors for the second resolution based on an AWV for each beam within the determined beam sectors for the second resolution;

determine a second resolution best beam for each determined sector for the second resolution; and determine a best beam by comparing the first resolution best beam with the second resolution best beam.

8. The wireless access point of claim 7, wherein the processor is further configured to send a transmit beam refinement protocol frame with transmit refinement transaction (TRN-T) subfields, from the wireless access point, to the at least one of the plurality of wireless stations.

9. The wireless access point of claim 8, wherein the processor is further configured to receive a best antenna weight vector (AWV), at the wireless access point, from the at least one of the plurality of wireless stations that was determined from the transmitter and receiver sector sweeps.

10. The wireless access point of claim 7, wherein the first and the second resolutions are performed for time division multiplexing and frequency division multiplexing communications between the access point and the at least one of the plurality of wireless stations.

* * * * *